(12) United States Patent
Konantambigi

(10) Patent No.: US 10,781,929 B2
(45) Date of Patent: Sep. 22, 2020

(54) VALVE

(71) Applicant: STOPAK INDIA PVT. LTD., Bangalore, Karnataka (IN)

(72) Inventor: Sunil Madhukar Konantambigi, Bangalore (IN)

(73) Assignee: Stopak India Pvt. Ltd., Bangalore (IN)

( * ) Notice: Subject to any disclaimer, the term of this patent is extended or adjusted under 35 U.S.C. 154(b) by 0 days.

(21) Appl. No.: 16/367,520

(22) Filed: Mar. 28, 2019

(65) Prior Publication Data

US 2019/0226593 A1    Jul. 25, 2019

Related U.S. Application Data

(63) Continuation-in-part of application No. PCT/IN2018/050561, filed on Aug. 30, 2018.

(30) Foreign Application Priority Data

Oct. 27, 2017    (IN) ............................. 201741038287

(51) Int. Cl.
*F16K 15/20*  (2006.01)
*F16K 15/06*  (2006.01)

(52) U.S. Cl.
CPC ............ *F16K 15/20* (2013.01); *F16K 15/063* (2013.01)

(58) Field of Classification Search
CPC ................................ F16K 15/20; F16K 15/063
See application file for complete search history.

(56) References Cited

U.S. PATENT DOCUMENTS

| | | | |
|---|---|---|---|
| 241,930 A | 5/1881 | Clayton et al. |
| 1,963,685 A | 6/1934 | Shimer |
| 2,390,199 A | 12/1945 | Walsh |
| 2,613,054 A | 10/1952 | Maier |
| 2,657,704 A | 11/1953 | Fausek et al. |
| 2,710,622 A | 6/1955 | Chupa |
| 2,764,428 A | 9/1956 | Murphy |
| 3,411,397 A | 11/1968 | William |
| 3,420,493 A | 1/1969 | Kraft |
| 3,445,089 A | 5/1969 | Murray |
| 3,785,395 A | 1/1974 | Andreasson |
| 3,808,981 A | 5/1974 | Shaw |
| 3,939,995 A | 2/1976 | Baxter |
| 3,960,281 A | 6/1976 | Reeves |
| 3,995,653 A | 12/1976 | Mackal et al. |
| 4,015,622 A | 4/1977 | Pagani |
| 4,046,163 A | 9/1977 | Novak |
| 4,073,389 A | 2/1978 | Angarola et al. |
| 4,102,364 A | 7/1978 | Leslie et al. |

(Continued)

FOREIGN PATENT DOCUMENTS

| CA | 1039148 A | 9/1978 |
|---|---|---|
| CA | 2390968 A1 | 12/2003 |

(Continued)

OTHER PUBLICATIONS

"International Search Report and Written Opinion", from PCT/IN2018/050561 (12 pages), dated Dec. 17, 2018.

*Primary Examiner* — P. Macade Nichols
(74) *Attorney, Agent, or Firm* — Neal, Gerber & Eisenberg LLP

(57) ABSTRACT

Various embodiments of the present disclosure provide a valve configured to enable the inflation and deflation of an inflatable object.

28 Claims, 26 Drawing Sheets

(56) References Cited

U.S. PATENT DOCUMENTS

| | | |
|---|---|---|
| 4,146,069 A | 3/1979 | Angarola et al. |
| 4,146,070 A | 3/1979 | Angarola et al. |
| 4,257,575 A | 3/1981 | Runyan |
| 4,375,825 A | 3/1983 | Greenspan |
| 4,478,587 A | 10/1984 | Mackal |
| 4,579,141 A | 4/1986 | Arff |
| 4,633,910 A | 1/1987 | Sugimura |
| 4,766,628 A | 8/1988 | Walker |
| 4,798,226 A | 1/1989 | Struth |
| 4,927,397 A | 5/1990 | Yeager |
| 5,042,541 A | 8/1991 | Krier et al. |
| 5,082,244 A | 1/1992 | Krier et al. |
| 5,111,838 A | 5/1992 | Langston |
| 5,143,351 A | 9/1992 | Pierce |
| 5,255,640 A | 10/1993 | Pierce |
| 5,285,805 A | 2/1994 | Proper |
| 5,339,959 A | 8/1994 | Cornwell |
| 5,540,528 A | 7/1996 | Schmidt et al. |
| 5,651,403 A | 7/1997 | Andersen |
| 5,674,206 A | 10/1997 | Allton et al. |
| 5,806,572 A | 9/1998 | Voller |
| 5,839,488 A | 11/1998 | Peters |
| 5,871,031 A | 2/1999 | Greinacher |
| D406,238 S | 3/1999 | Voller |
| 5,881,783 A | 3/1999 | Chou |
| 5,941,272 A | 8/1999 | Feldman |
| 5,971,016 A | 10/1999 | Wass et al. |
| 6,053,222 A | 4/2000 | Peters |
| 6,085,774 A | 7/2000 | Andersen |
| 6,089,251 A | 7/2000 | Pestel |
| 6,138,711 A | 10/2000 | Lung-Po |
| 6,375,158 B1 | 4/2002 | Kraemer et al. |
| 6,386,247 B1 | 5/2002 | Elze et al. |
| D458,135 S | 6/2002 | Hierzer |
| D459,228 S | 6/2002 | Hierzer |
| 6,460,560 B1 | 10/2002 | Weinheimer et al. |
| 6,634,384 B2 | 10/2003 | Skeens et al. |
| 6,676,042 B2 | 1/2004 | Howlett et al. |
| 6,823,905 B1 | 11/2004 | Smith et al. |
| 6,929,021 B2 | 8/2005 | Cavenagh |
| 6,978,749 B2 | 12/2005 | Simpson |
| 6,990,994 B2 | 1/2006 | Reeb et al. |
| 7,008,155 B2 | 3/2006 | Smith et al. |
| 7,051,753 B1 | 5/2006 | Caires et al. |
| 7,063,102 B2 | 6/2006 | Lin |
| 7,195,029 B2 | 3/2007 | Wass |
| 7,320,347 B2 | 1/2008 | Ramsey et al. |
| 7,401,619 B2 | 7/2008 | Song et al. |
| 7,410,145 B1 | 8/2008 | Elze et al. |
| 7,434,594 B1 | 10/2008 | Robbins et al. |
| 7,438,081 B1 | 10/2008 | Chen |
| 7,455,086 B1 | 11/2008 | Elze et al. |
| 7,497,416 B2 | 3/2009 | Wang |
| 7,610,929 B2 | 11/2009 | Zielinski et al. |
| 7,793,687 B2 | 9/2010 | Smith et al. |
| 7,909,554 B2 | 3/2011 | Keenan et al. |
| 7,980,799 B1 | 7/2011 | Rioux et al. |
| 8,235,632 B2 | 8/2012 | Keenan |
| 8,297,603 B2 | 10/2012 | Imaizumi et al. |
| 8,347,919 B2 | 1/2013 | Tsai |
| D679,589 S | 4/2013 | Hauth |
| 8,485,398 B2 | 7/2013 | Kneer |
| 8,555,841 B2 | 10/2013 | Zhu |
| 8,627,852 B2 | 1/2014 | Hatton |
| 8,667,982 B2 | 3/2014 | Song et al. |
| 8,753,051 B2 | 6/2014 | Qiang |
| 8,899,200 B2 | 12/2014 | Aoki et al. |
| 8,919,731 B2 | 12/2014 | Langston et al. |
| 9,121,519 B2 | 9/2015 | Wang et al. |
| 9,314,108 B2 | 4/2016 | Defranks et al. |
| 9,505,334 B2 | 11/2016 | Maness et al. |
| 9,915,365 B2 | 3/2018 | Pansegrouw |
| 10,161,537 B2 | 12/2018 | Maness et al. |
| 2003/0213518 A1 | 11/2003 | Zielinski et al. |
| 2005/0129479 A1 | 6/2005 | Smith et al. |
| 2006/0033067 A1 | 2/2006 | Wang |
| 2006/0266416 A1 | 11/2006 | Chen |
| 2007/0163652 A1 | 7/2007 | Pekar et al. |
| 2008/0029166 A1 | 2/2008 | Song et al. |
| 2009/0139582 A1 | 6/2009 | Franta et al. |
| 2010/0043914 A1 | 2/2010 | Pansegrouw |
| 2010/0154897 A1 | 6/2010 | Wu |
| 2010/0180971 A1 | 7/2010 | Hatton |
| 2012/0048392 A1 | 3/2012 | Song et al. |
| 2012/0285552 A1* | 11/2012 | Song ............... F16K 15/20 137/223 |
| 2014/0202556 A1 | 7/2014 | Do Van |
| 2014/0209185 A1 | 7/2014 | Wang et al. |
| 2014/0238505 A1 | 8/2014 | Petersen |
| 2015/0037113 A1 | 2/2015 | Maness et al. |
| 2016/0186875 A1 | 6/2016 | Pansegrouw |
| 2018/0094553 A1 | 4/2018 | Nair et al. |
| 2018/0172169 A1 | 6/2018 | Pansegrouw |
| 2019/0113145 A1 | 4/2019 | Maness et al. |

FOREIGN PATENT DOCUMENTS

| | | |
|---|---|---|
| CA | 2851909 A1 | 4/2013 |
| CN | 2072178 U | 2/1991 |
| CN | 201487325 U | 5/2010 |
| DE | 9002226.2 U1 | 4/1990 |
| DE | 202006000232 U1 | 5/2006 |
| DE | 202007000758 U1 | 4/2007 |
| EP | 0849513 A2 | 6/1998 |
| FR | 2627839 A1 | 9/1989 |
| GB | 860269 A | 2/1961 |
| GB | 2038452 A | 7/1980 |
| JP | 01090009 A | 4/1989 |
| WO | 9406695 A1 | 3/1994 |
| WO | 9816767 A1 | 4/1998 |
| WO | 0157422 A1 | 8/2001 |
| WO | 2008110981 A1 | 9/2008 |
| WO | 2015020872 A2 | 2/2015 |
| WO | 2015020872 A3 | 4/2015 |

* cited by examiner

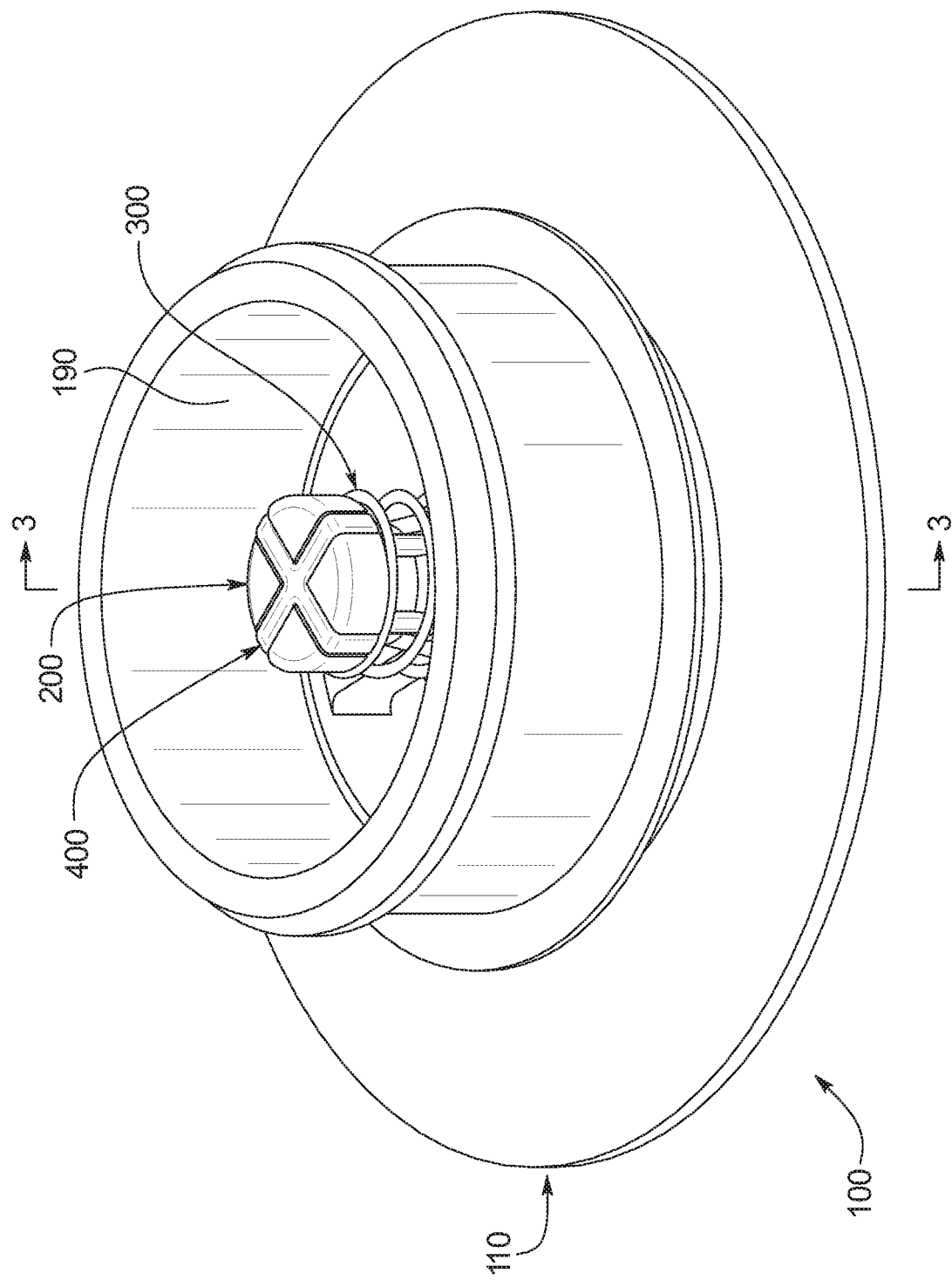

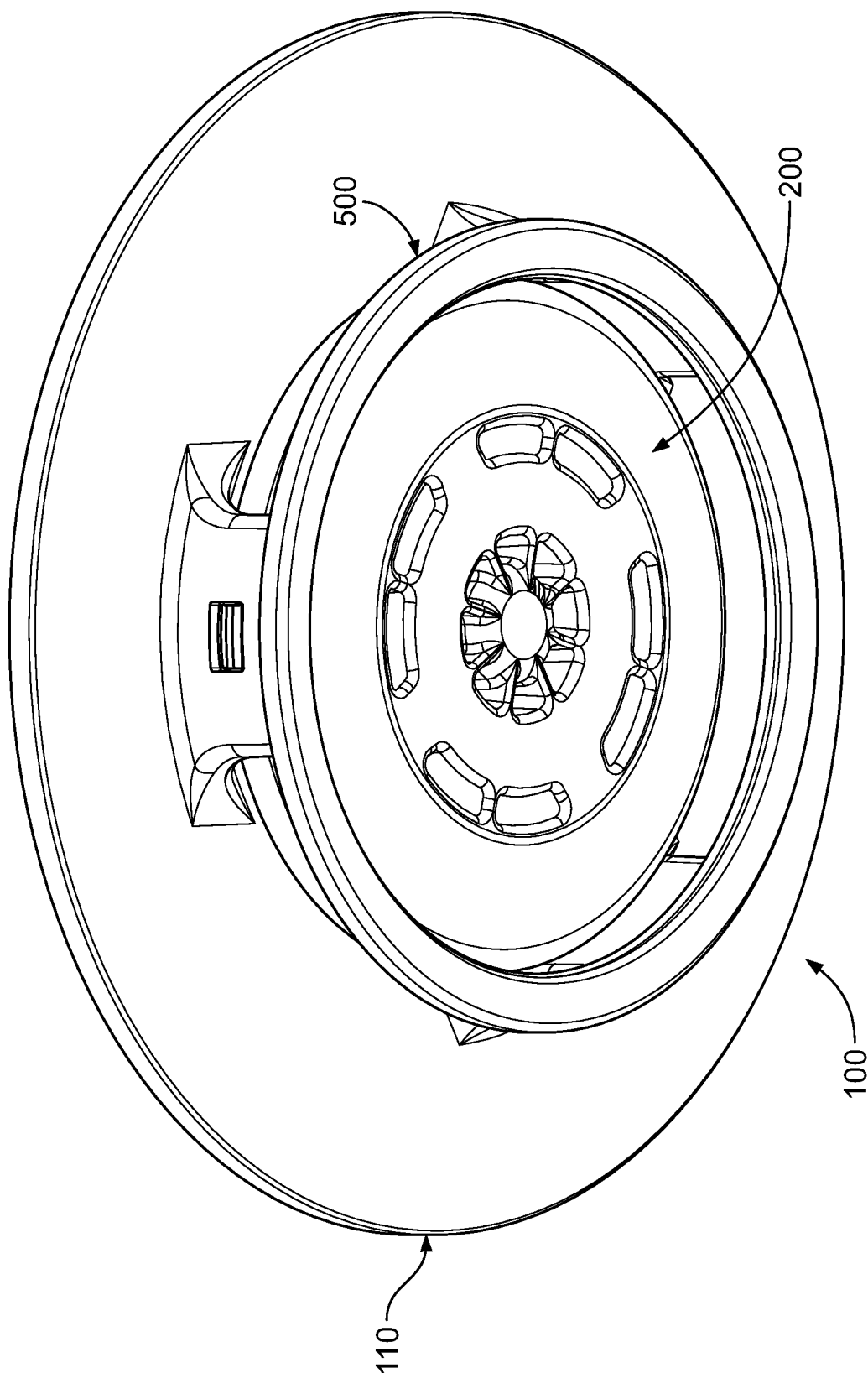

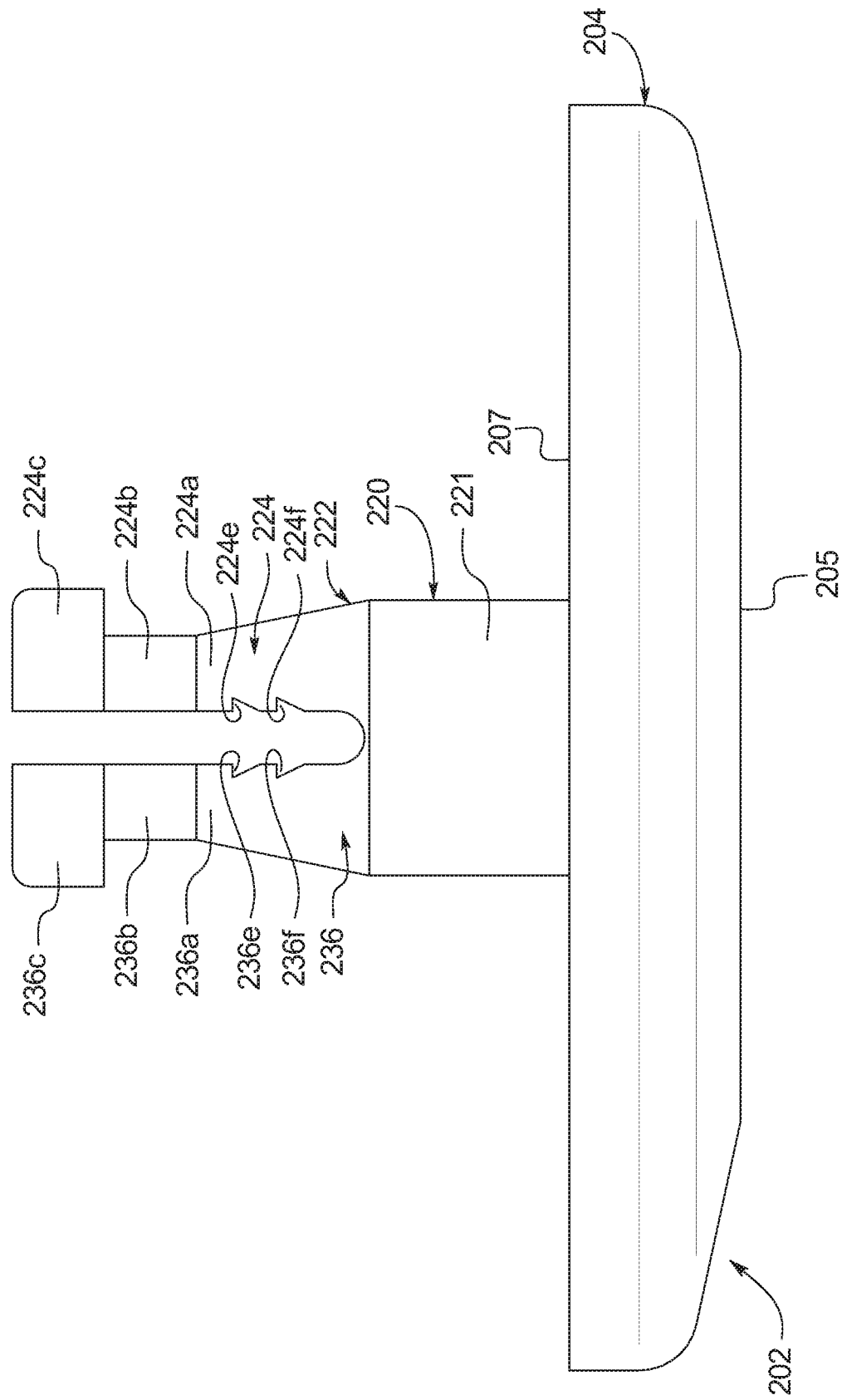

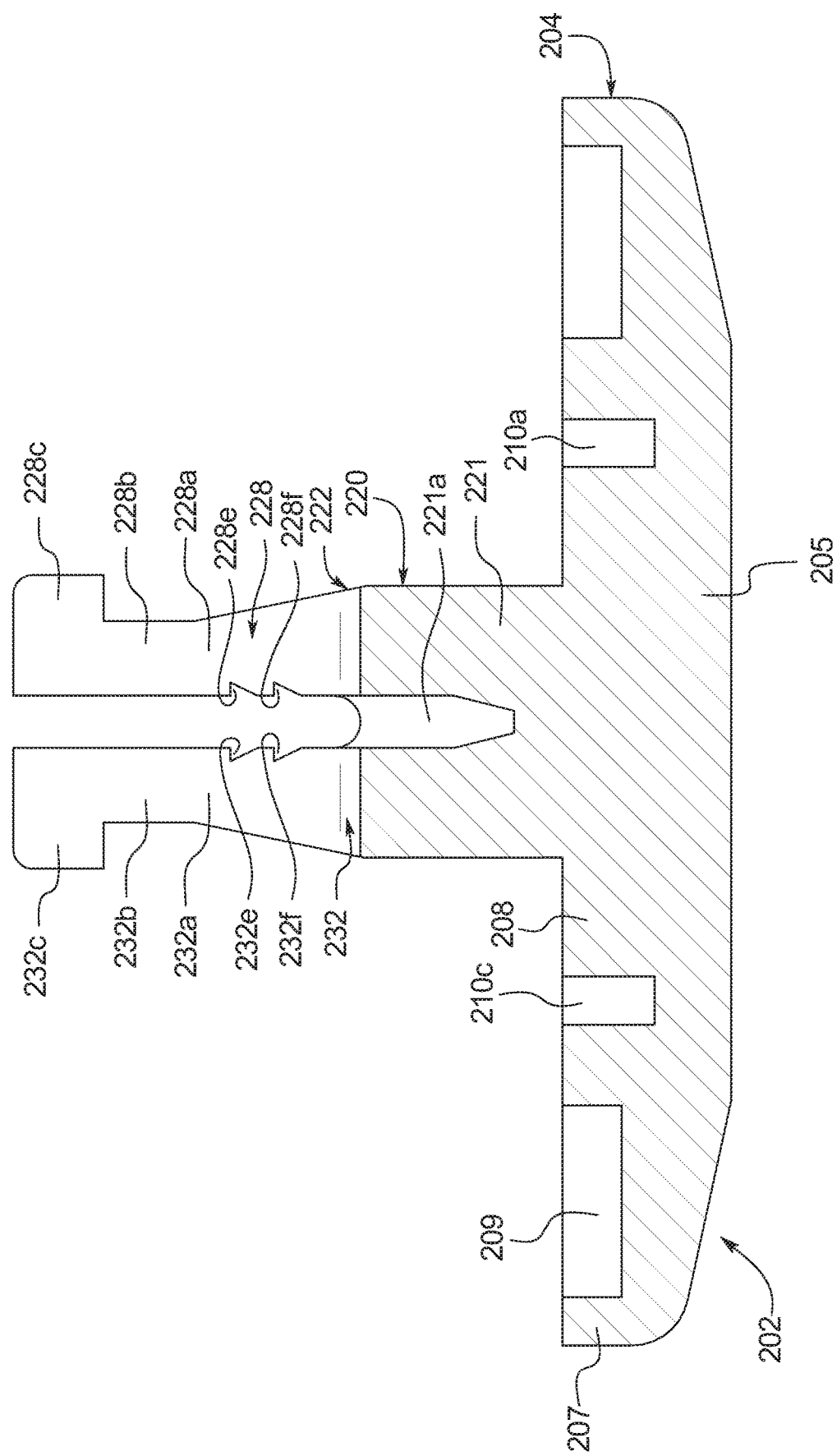

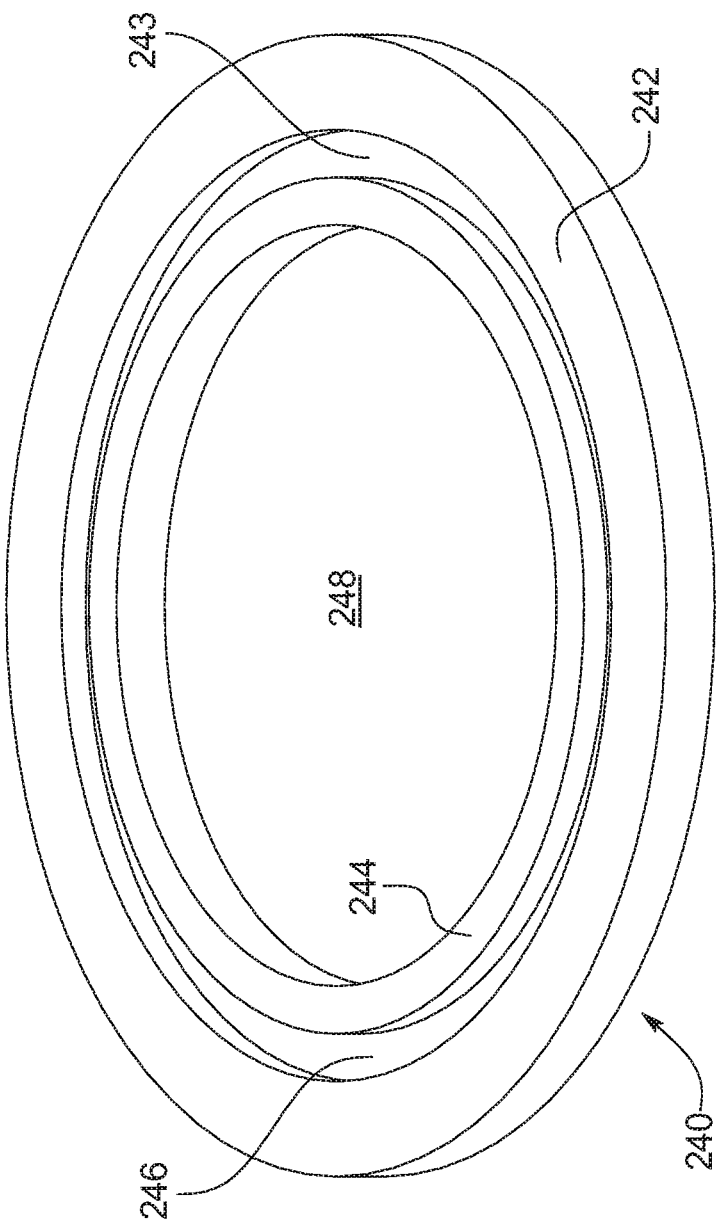

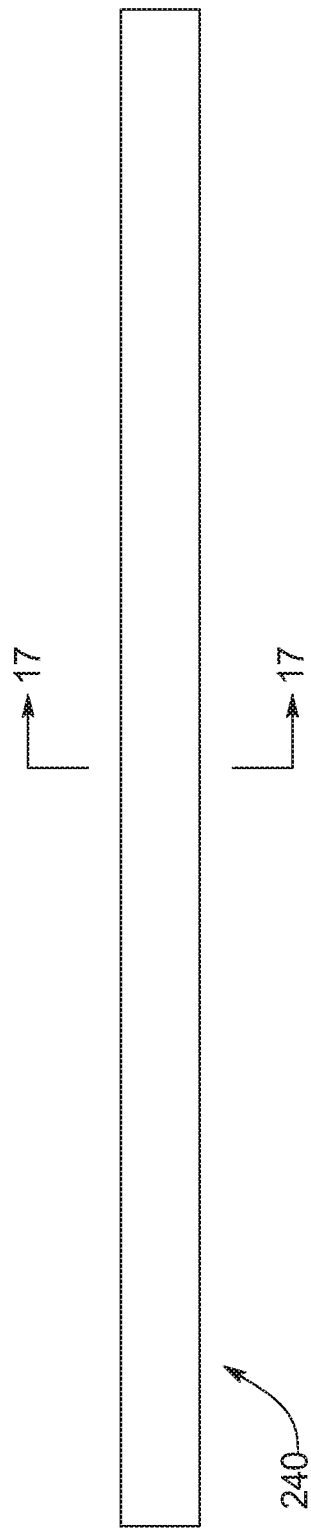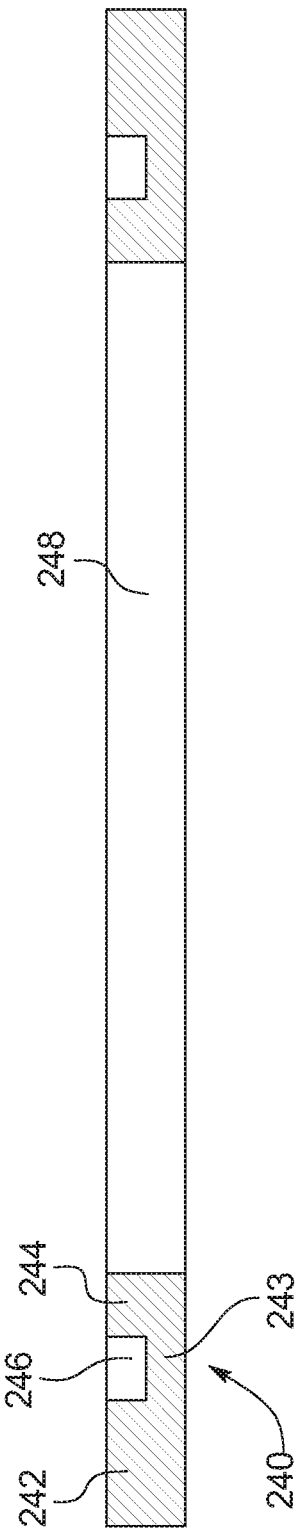

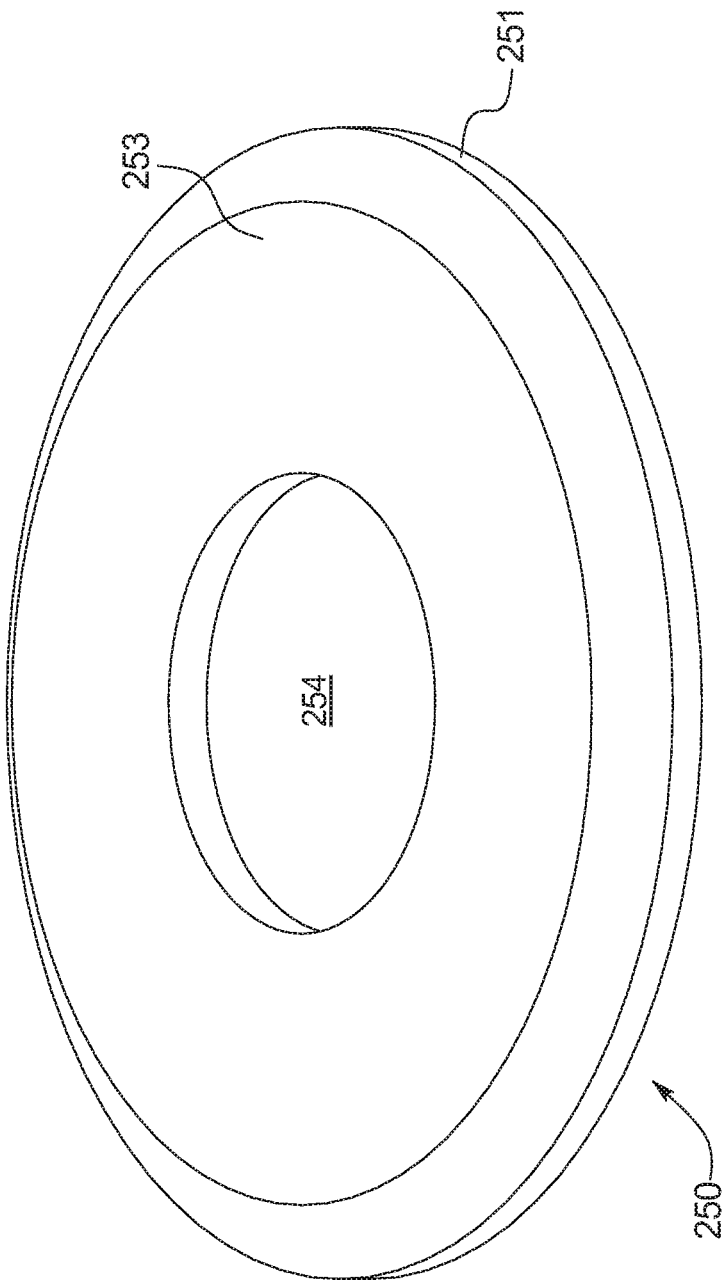

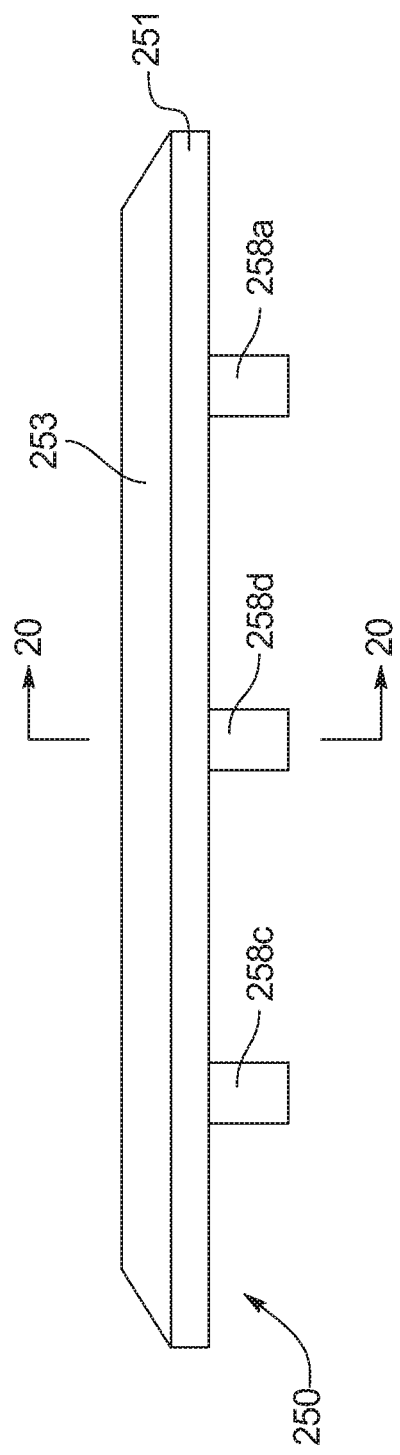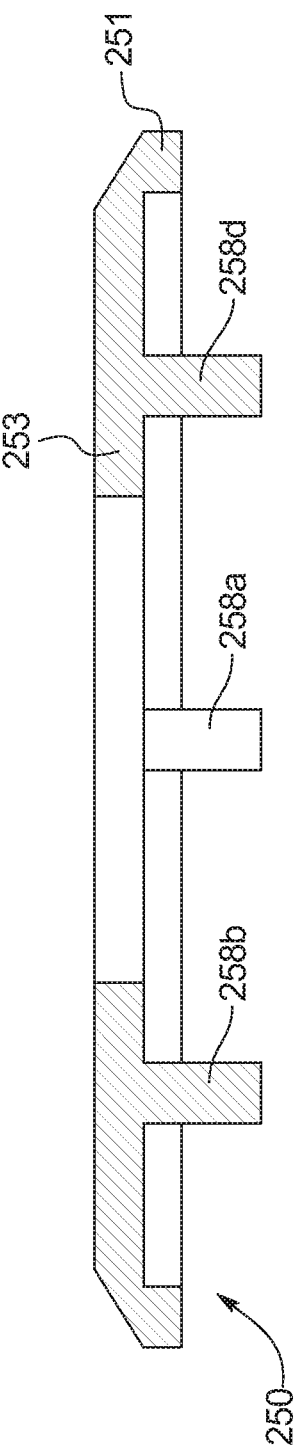

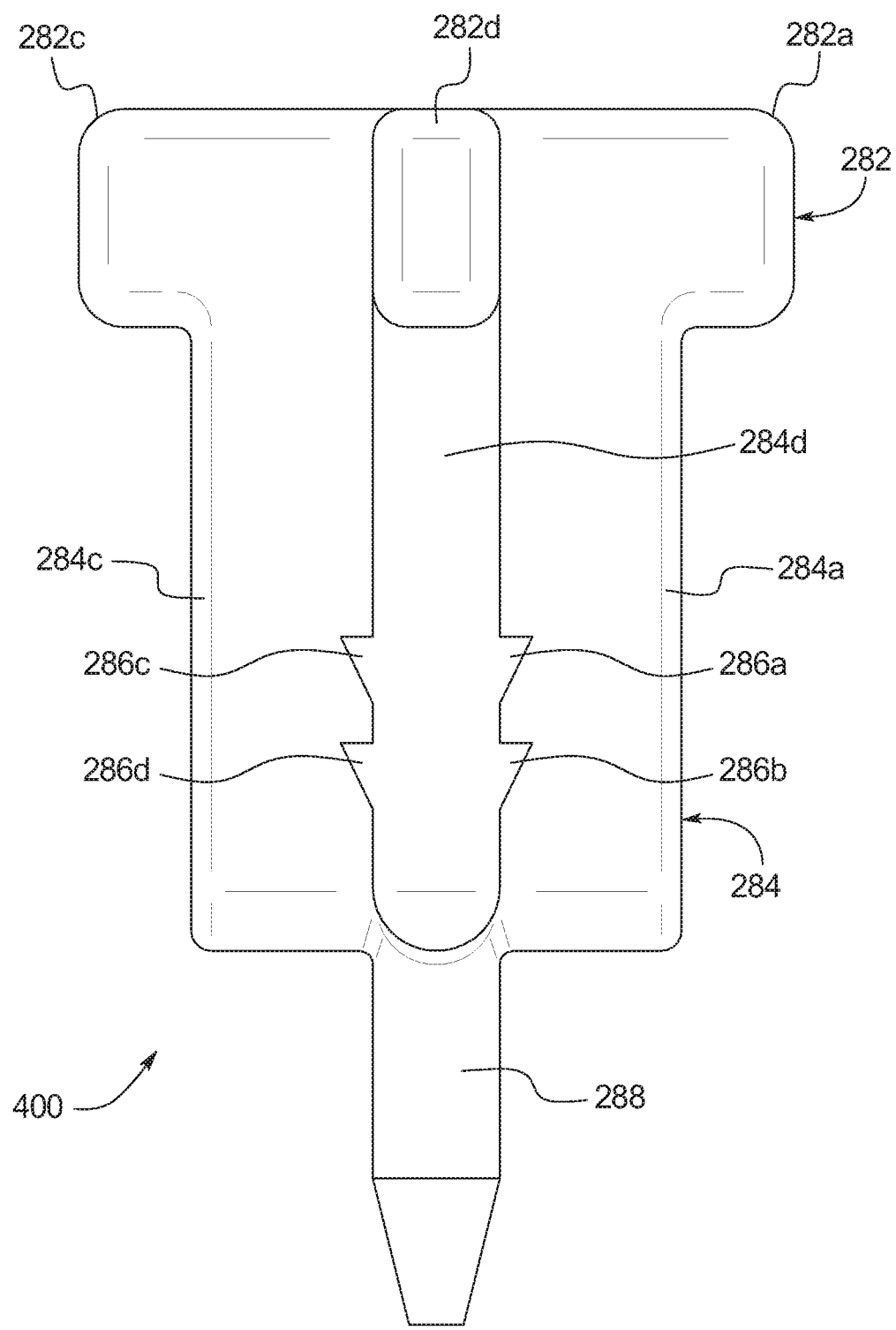

VALVE

PRIORITY CLAIM

This patent application is a continuation-in-part of International Patent Application No. PCT/IN2018/050561, which was filed on Aug. 30, 2018, which claims priority to and the benefit of Indian Patent Application No. 201741038287, which was filed on Oct. 27, 2017, the entire contents of each of which are incorporated herein by reference.

BACKGROUND

Inflatable dunnage bags are used to stabilize and limit movement of cargo during transportation of cargo containers. A typical dunnage bag includes an airtight inner bladder enclosed within an outer bag that is formed from either paper or plastic. The dunnage bag also includes a valve that enables inflation and deflation of the inner bladder. The valve is attached to the outer bag (and in some cases the inner bladder) and in fluid communication with the interior of the inner bladder. Generally, after some or all of the cargo is loaded into a cargo container, an uninflated dunnage bag is positioned in a void between the cargo. An operator then connects an inflator to the valve of the dunnage bag and uses the inflator to direct pressurized air into the bladder of the dunnage bag to inflate the dunnage bag to a desired pressure. The inflated dunnage bag fills the void between the cargo to limit lateral movement of the cargo during transit.

SUMMARY

Various embodiments of the present disclosure provide a valve configured to enable the inflation and deflation of an inflatable object.

One embodiment of the valve of the present disclosure includes a housing defining a gas passageway therethrough and a sealing assembly mounted to and moveable relative to the housing between a closed position that prevents gas from passing through the housing via the gas passageway and an open position that enables gas to pass through the housing via the gas passageway. The sealing assembly includes a stem, a sealing ring mounted to the stem, and a sealing plate attached to the stem. The sealing ring sealingly engages the housing when the sealing assembly is in the closed position and is spaced-apart from the housing when the sealing assembly is in the open position. The sealing plate retains the sealing ring in place on the stem. The valve includes a spring that biases the sealing assembly to the closed position and a locking member lockingly engaged to the stem to retain the spring and the sealing assembly on the housing.

In certain embodiments, the housing of the valve includes downwardly extending standoffs and an anti-puncture ring attached to the standoffs to prevent the standoffs from damaging the inflatable object (such as during deflation).

BRIEF DESCRIPTION OF THE FIGURES

FIG. 1 is a top perspective view of one example embodiment of a valve of the present disclosure in a closed configuration.

FIG. 2 is a bottom perspective view of the valve of FIG. 1 in the closed configuration.

FIG. 13 is a side elevational view of the stem of FIG. 10.

FIG. 14 is a cross-sectional view of the stem of FIG. 10 taken substantially along line 14-14 of FIG. 11.

FIG. 15 is a top perspective view of the sealing ring of the sealing assembly of the valve of FIG. 1.

FIG. 16 is a side elevational view of the sealing ring of FIG. 15.

FIG. 17 is a cross-sectional view of the sealing ring of FIG. 15 taken substantially along line 17-17 of FIG. 16.

FIG. 18 is a top perspective view of the sealing plate of the sealing assembly of the valve of FIG. 1.

FIG. 19 is a side elevational view of the sealing plate of FIG. 18.

FIG. 20 is a cross-sectional view of the sealing plate of FIG. 18 taken substantially along line 20-20 of FIG. 19.

FIG. 23A is a side elevational view of the locking member of FIG. 21A shown from a first side.

DETAILED DESCRIPTION

Figure 3A:
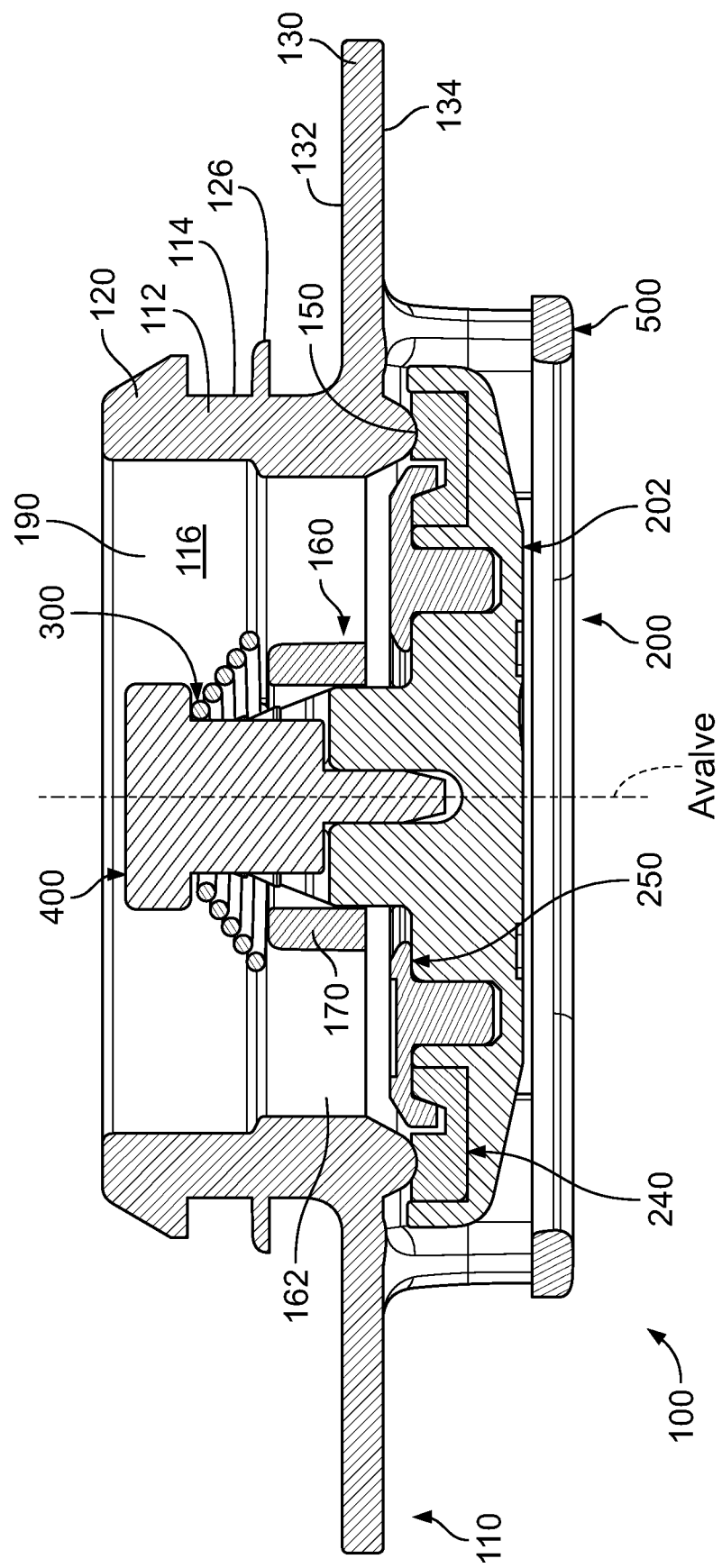
FIG. 3A is a cross-sectional view of the valve of FIG. 1 in the closed configuration taken substantially along line 3-3 of FIG. 1.

While the systems, devices, and methods described herein may be embodied in various forms, the drawings show and the specification describes certain exemplary and non-limiting embodiments. Not all of the components shown in the drawings and described in the specification may be required, and certain implementations may include additional, different, or fewer components. Variations in the arrangement and type of the components; the shapes, sizes, and materials of the components; and the manners of connection of the components may be made without departing from the spirit or scope of the claims. Unless otherwise indicated, any directions referred to in the specification reflect the orientations of the components shown in the corresponding drawings and do not limit the scope of the present disclosure. Further, terms that refer to mounting methods, such as coupled, mounted, connected, etc., are not intended to be limited to direct mounting methods, but should be interpreted broadly to include indirect and operably coupled, mounted, connected, and like mounting methods. This specification is intended to be taken as a whole and interpreted in accordance with the principles of the present disclosure and as understood by one of ordinary skill in the art.

Various embodiments of the present disclosure provide a valve configured to enable the inflation and deflation of an inflatable object. The valve of the present disclosure is described below as being attached to (and usable to inflate/deflate) a dunnage bag (not shown) that includes an airtight plastic inner bladder enclosed within an outer paper or polywoven bag. This is merely one example inflatable object with which the valve may be used, and the valve may be used in connection with any other suitable inflatable object such as (but not limited to) an air mattress, a raft, and/or a tire.

Figure 3B:
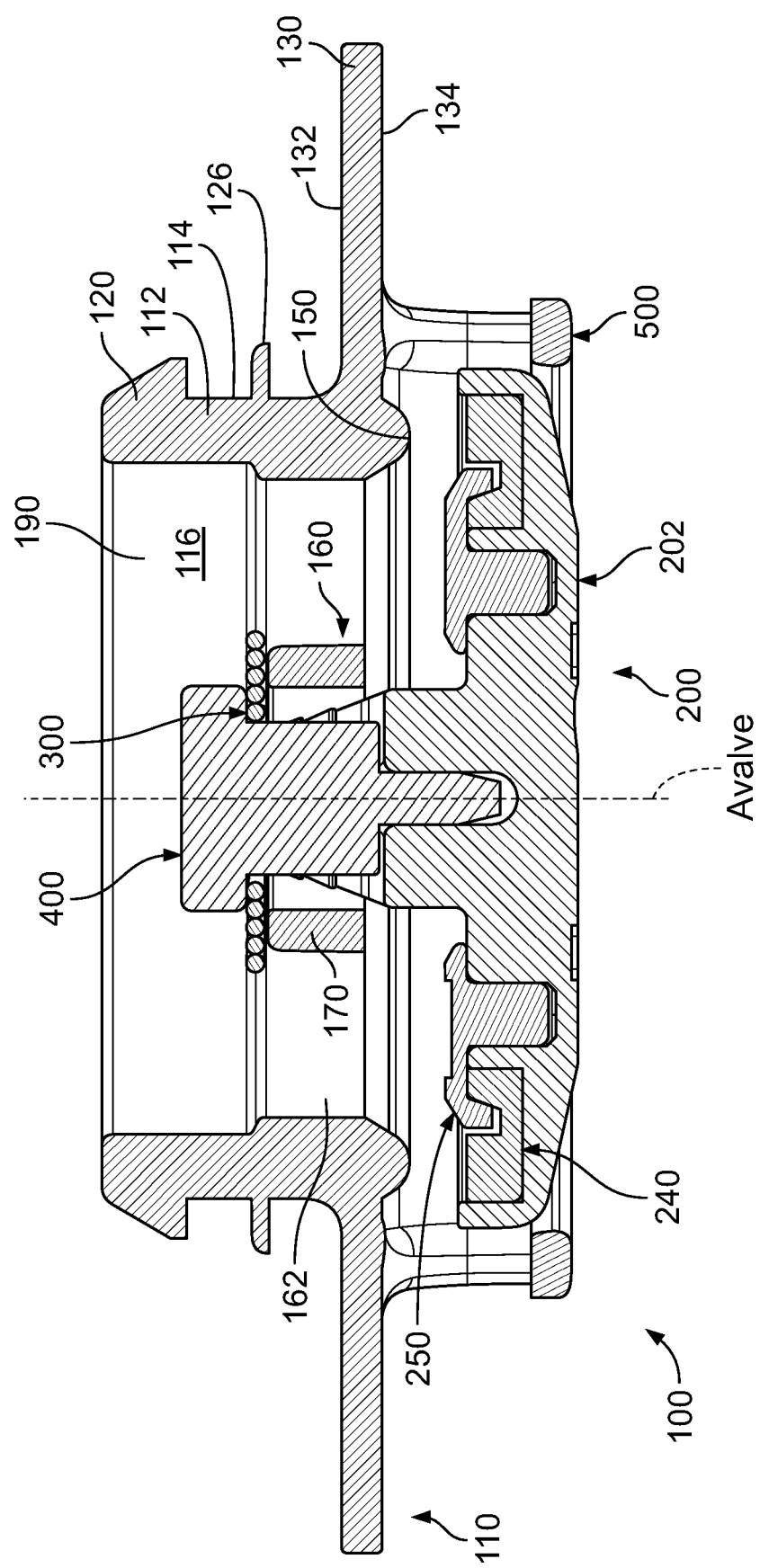
FIG. 3B is a cross-sectional view of the valve of FIG. 1 in the open configuration taken substantially along line 3-3 of FIG. 1.

Referring now to the drawings, FIGS. 1-25 illustrate one example valve 100 of the present disclosure. As best shown in. FIGS. 3A and 3B, the valve 100 has a longitudinal axis $A_{VALVE}$ and includes a housing 110 that defines a gas passageway 190, a sealing assembly 200 mounted to the housing 110 partially within the gas passageway 190 and axially (relative to $A_{VALVE}$) movable relative to the housing 110 between a closed position (FIG. 3A) and an open position (FIG. 3B), a spring 300 that biases the sealing assembly 200 to the closed position, a locking member 400 that lockingly engages the sealing assembly 200 to retain the spring 300 and the sealing assembly 200 in place on the housing 110, and an anti-puncture ring 500 that prevents standoffs on the housing 110 from damaging the dunnage bag.

When in the closed position (FIG. 3A), the sealing assembly 200 sealingly engages the housing 110 and thus prevents gas from flowing through the housing 110 via the gas passageway 190. In this scenario the valve 100 is in a closed configuration. When in the open position (FIG. 3B), the sealing assembly 200 does not sealingly engage the housing 110 and thus enables gas to flow through the housing 110 via the gas passageway 190. In this scenario the valve 100 is in an open configuration. Accordingly, the position of the sealing assembly 200 relative to the housing 110 controls whether the valve 100 is in the open configuration or the closed configuration and thus controls the flow of gas through the housing 110 via the gas passageway 190.

The housing 110 is best shown in FIGS. 5-9 and is configured to support the sealing assembly 200, the spring 300, and the locking member 400; is configured to attach the valve 100 to the dunnage bag; and (partially) defines the gas passageway 190. The housing 110 includes an annular wall 112; an annular cap-mounting lip 120; a retaining ring 126; an annular attachment flange 130; an annular sealing seat 150; a stem support 160; and multiple standoffs 182, 184, and 186.

The wall 112 has opposing outer and inner cylindrical surfaces 114 and 116. The inner surface 114 partially defines the gas passageway 190. The cap-mounting lip 120 is integrally connected to and extends radially outwardly (relative to $A_{VALVE}$) from the outer surface 114 of the wall 112 near the top of the wall 112. The cap-mounting lip 120 is sized, shaped, positioned, and otherwise configured to be engaged by a suitable cap (not shown) to lock the cap in place on the housing 110. When locked in place on the housing 110, the cap prevents gas from flowing through the gas passageway 190. While the cap-mounting lip 120 is illustrated as continuous around the outer perimeter of the wall 112, in other embodiments the cap-mounting lip 120 is not continuous and, for instance, is formed from multiple disconnected portions that extend around different parts of the outer circumference of the wall 112. Some embodiments of the valve do not include a cap-mounting lip.

The attachment flange 130 is integrally connected to and extends radially outwardly (relative to $A_{VALVE}$) from the outer surface 114 of the wall 112 near the bottom of the wall 112. The attachment flange 130 has opposing upper and lower surfaces 132 and 134.

The retaining ring 126 is integrally connected to and extends radially outwardly (relative to $A_{VALVE}$) from the outer surface 114 of the wall 112 between the cap-mounting lip 120 and the attachment flange 130. While the retaining ring 126 is illustrated as continuous around the outer perimeter of the wall 112, in other embodiments the retaining ring 126 is not continuous and, for instance, is formed from multiple disconnected portions that extend around different parts of the outer circumference of the wall 112.

The sealing seat 150 of the housing 110 is formed on and extends axially downwardly (relative to $A_{VALVE}$) from the bottom of the wall 112. As shown in FIG. 3A, the sealing seat 150 is configured to sealingly engage a sealing ring of the sealing assembly 200 (described below) when the sealing assembly 200 is in the closed position (and the valve 100 is in the closed configuration) to prevent gas from flowing through the housing 110 via the gas passageway 190.

Figure 6:
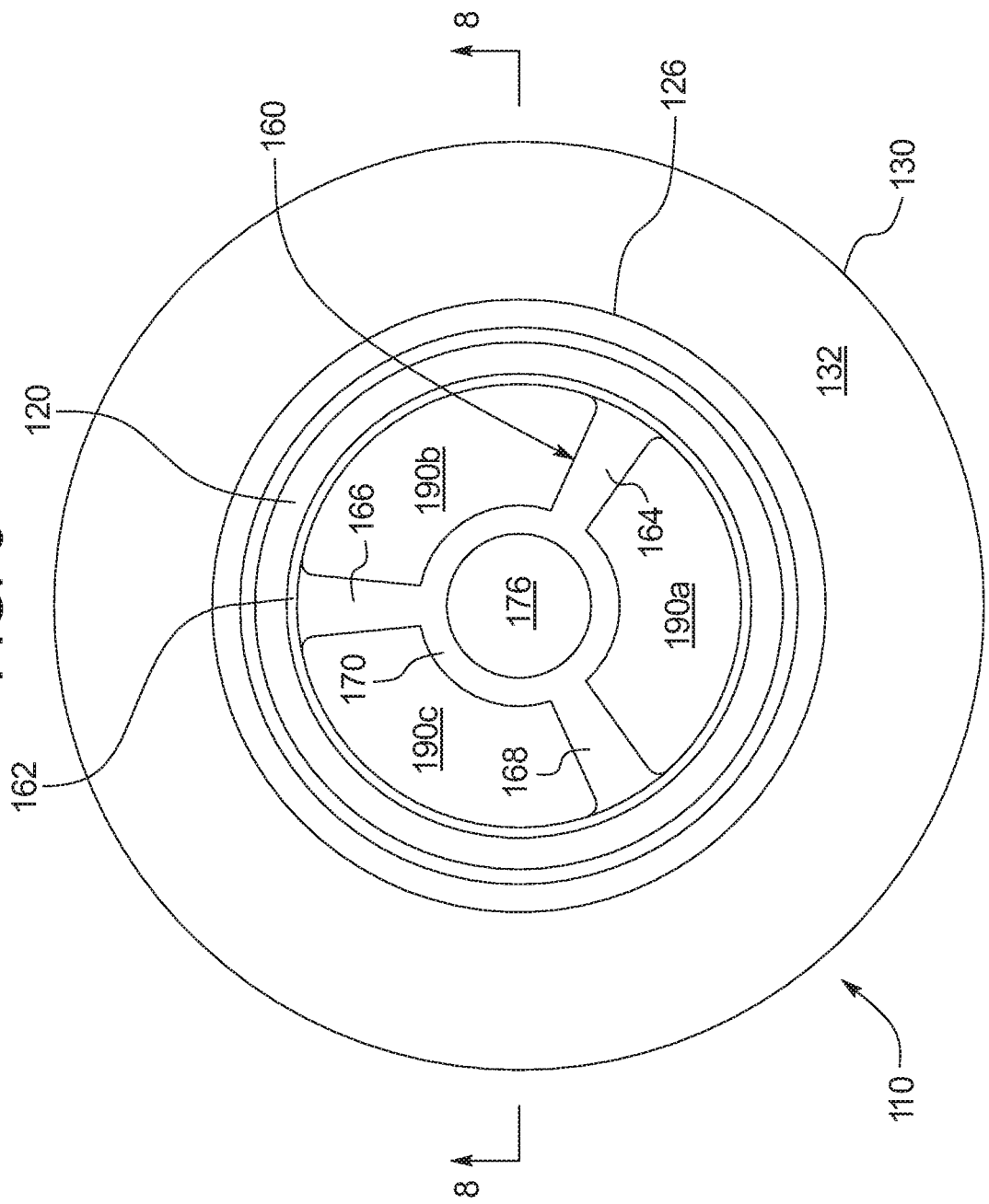
FIG. 6 is a top plan view of the housing of FIG. 5.
Figure 7:
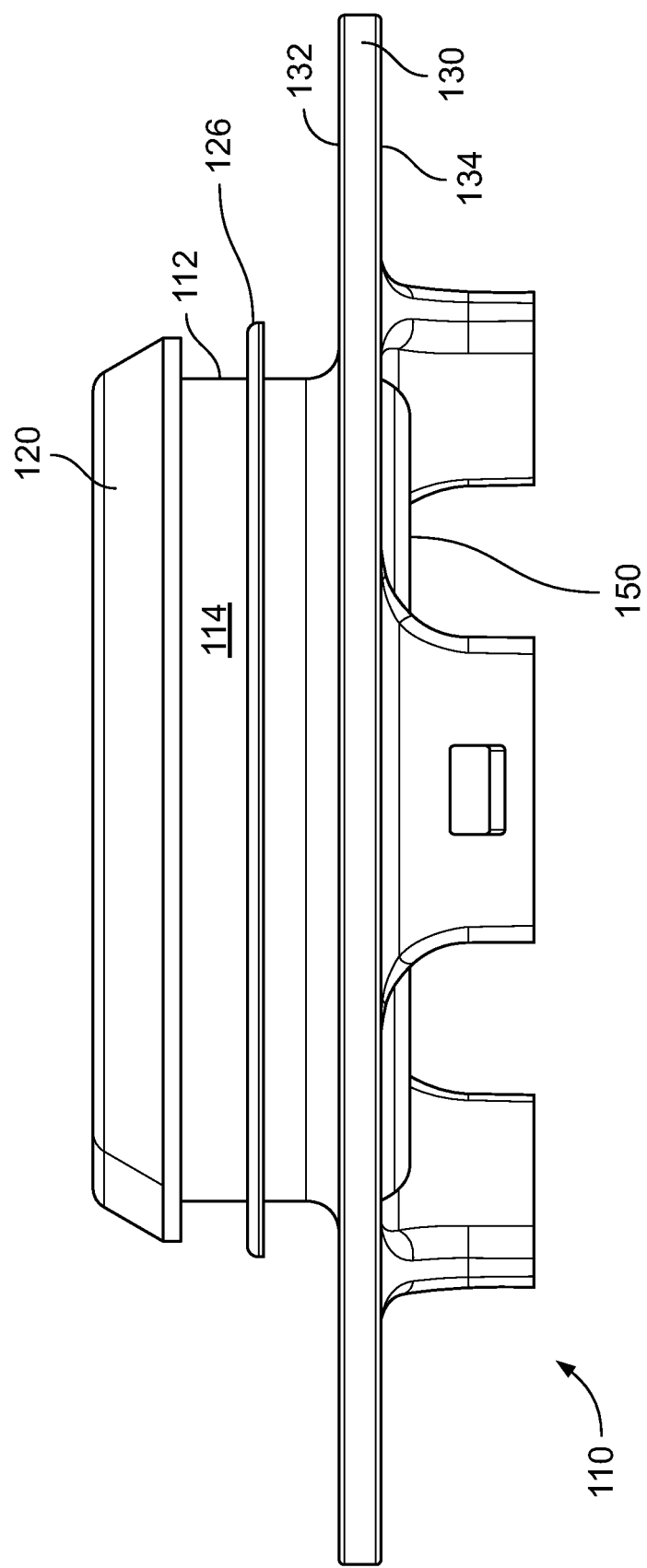
FIG. 7 is a side elevational view of the housing of FIG. 5.
Figure 8:
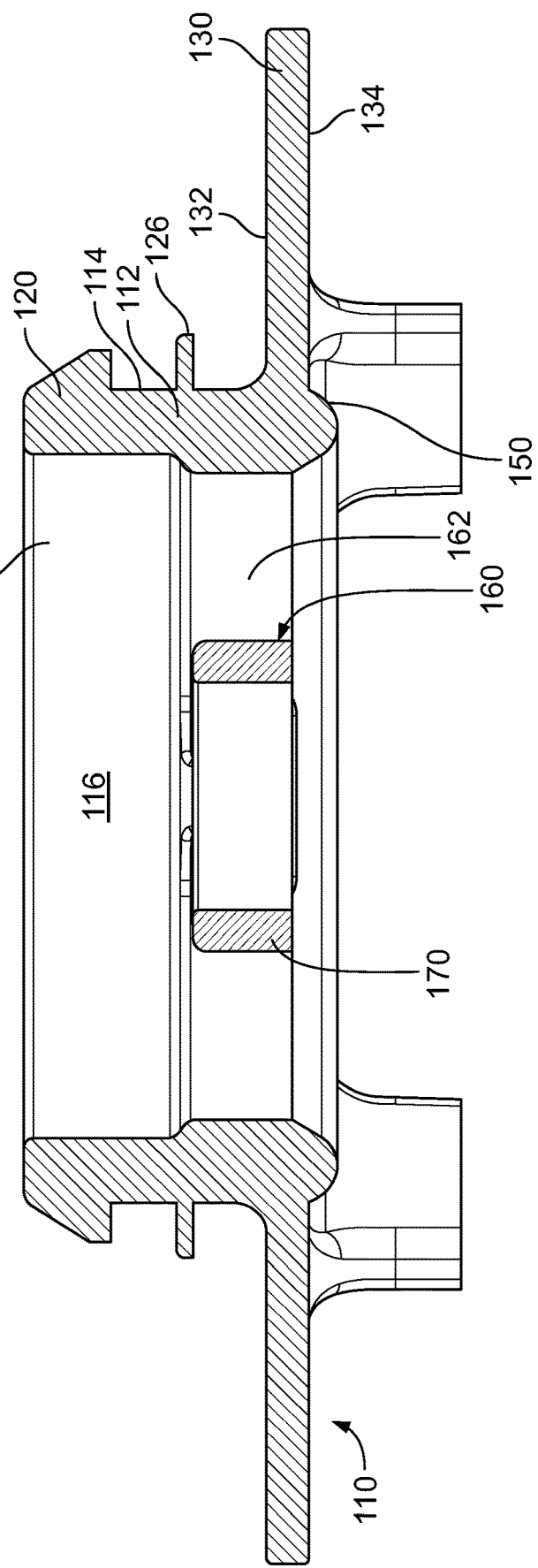
FIG. 8 is a cross-sectional view of the housing of FIG. 5 taken substantially along line 8-8 of FIG. 6.

The stem supporter 160 is configured to support the spring 300 and the sealing assembly 200 while enabling the sealing assembly 200 to move relative to the housing 110 and to define passageways for gas to flow through during inflation or deflation of the dunnage bag. As best shown in. FIG. 6, the stem supporter 160 includes an outer ring 162 integrally connected to and extending radially inwardly (relative to $A_{VALVE}$) from the inner surface 116 of the wall 112; three spaced-apart connecting arms 164, 166, and 168 integrally connected to and extending radially inwardly (relative to $A_{VALVE}$) from the outer ring 162; and an inner ring 170 integrally connected to and extending radially inwardly (relative to $A_{VALVE}$) from each of the connecting arms 164, 166, and 168. The inner ring 170 defines a central stem-receiving opening 176 therethrough sized, shaped, positioned, and otherwise configured so a shaft of the sealing assembly 200 (described below) is receivable in and afterwards axially (relative to $A_{VALVE}$) moveable relative to the stem supporter 160.

The connecting arms 164, 166, and 168 and the inner ring 170 define three spaced-apart gas passage openings 190a, 190b, and 190c that partially define the gas passageway 190. When the valve 100 is in the open configuration, these gas-passage openings 190a, 190b, and 190c enable a significant amount of gas to pass though the housing 110 and thus the valve 100 to inflate or deflate the dunnage bag, depending on the situation.

Figure 9:
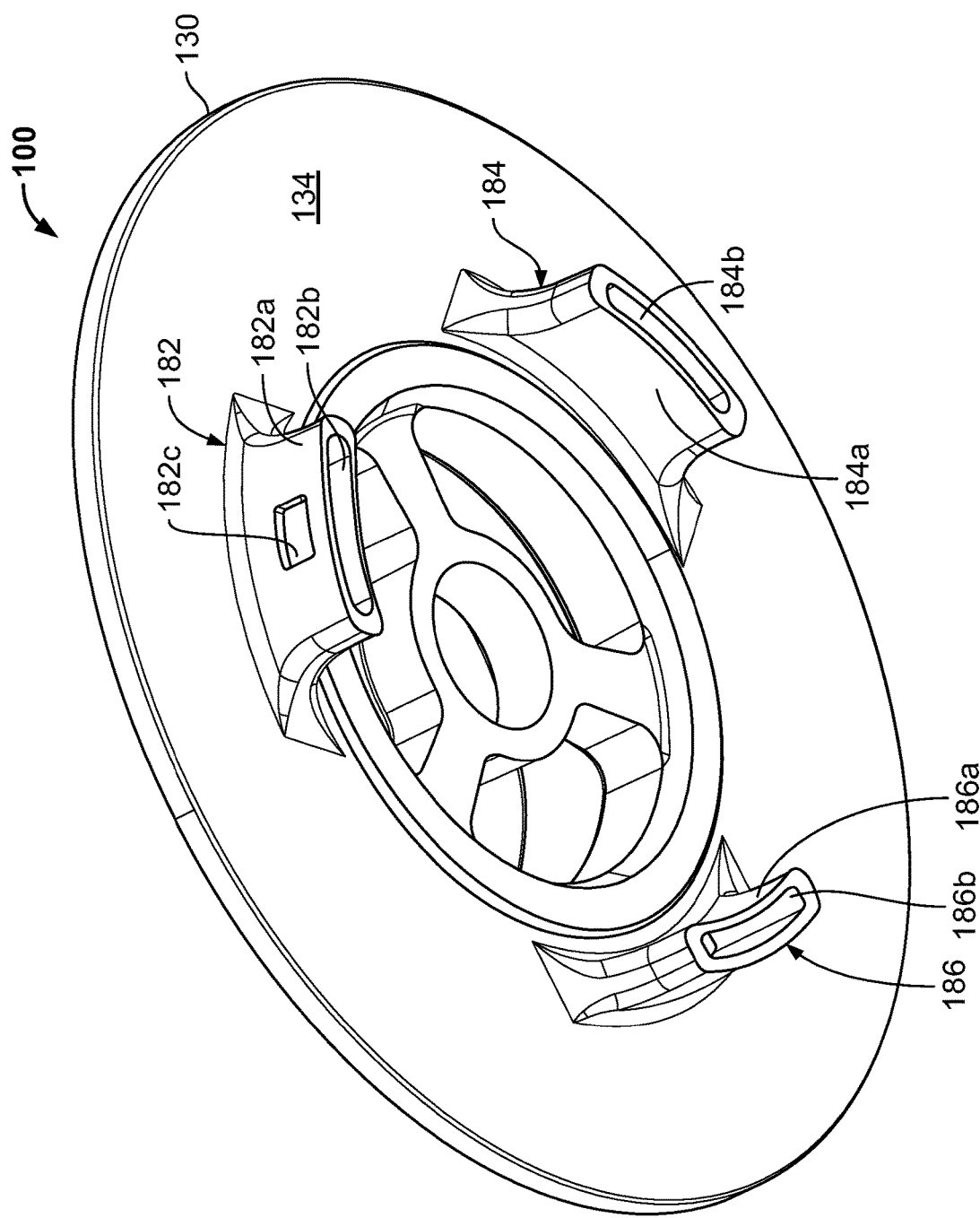
FIG. 9 is a bottom perspective view of the housing of FIG. 5.
Figure 10:
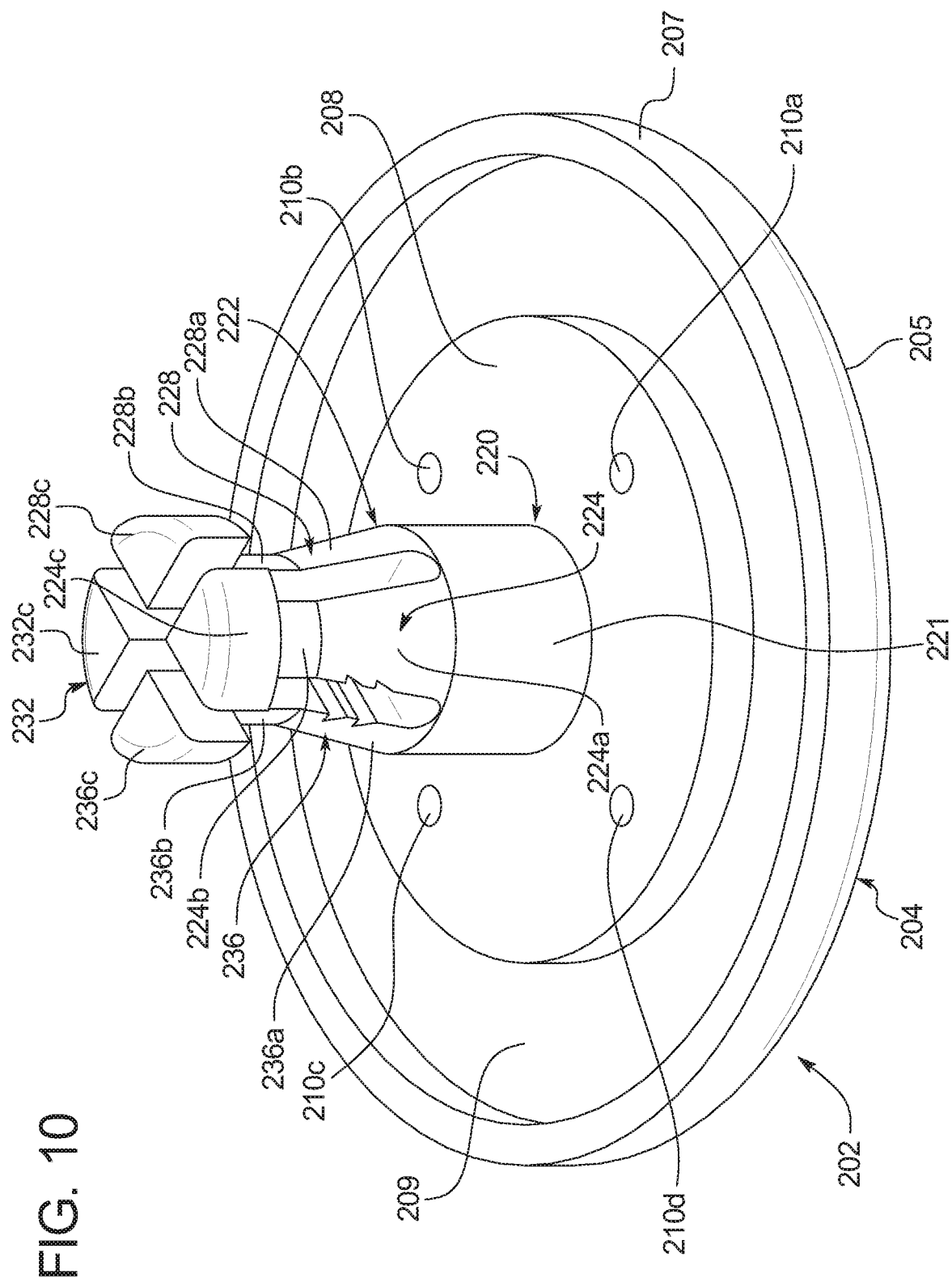
FIG. 10 is a top perspective view of the stem of the sealing assembly of the valve of FIG. 1.
Figure 11:
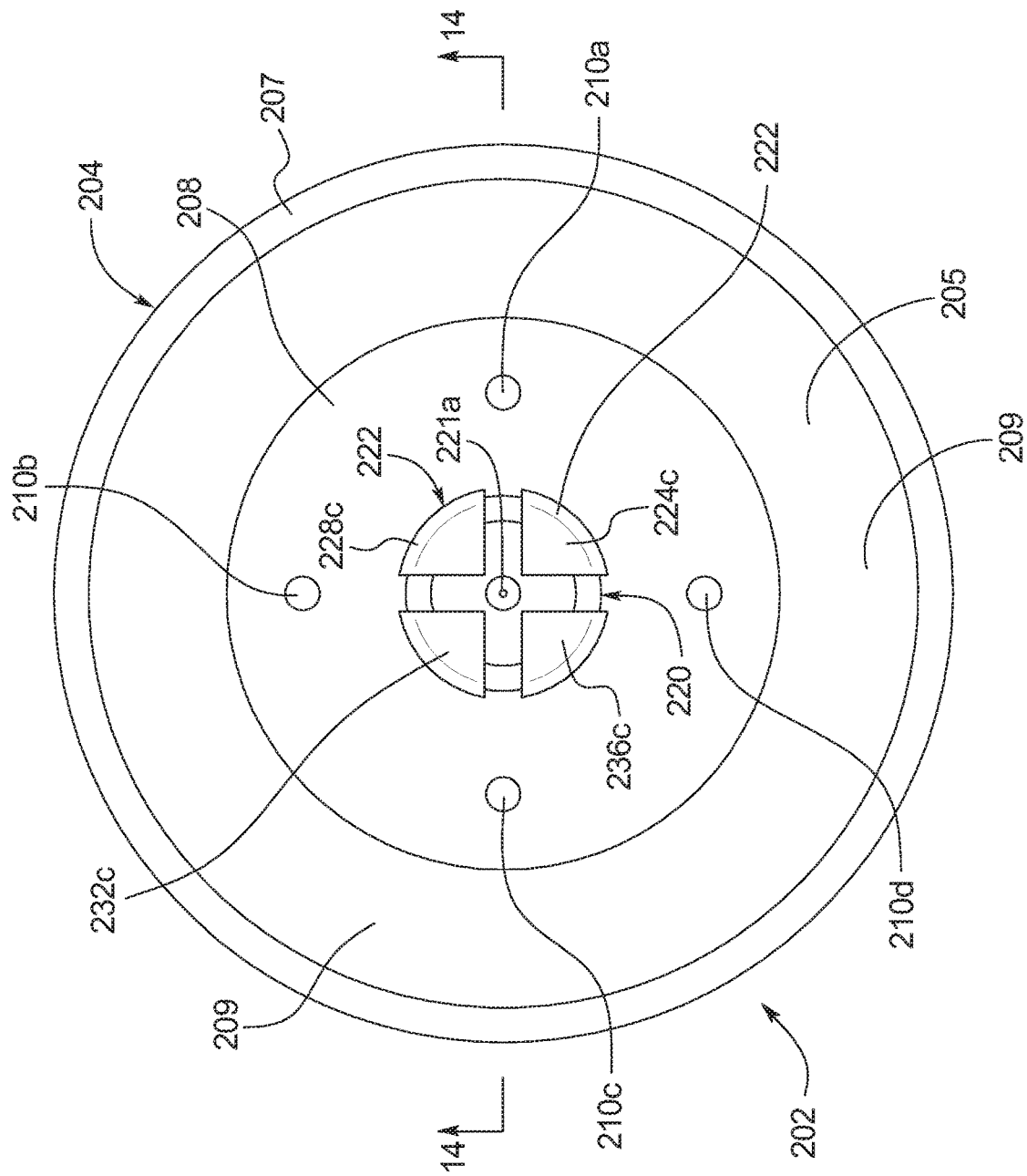
FIG. 11 is a top plan view of the stem of FIG. 10.
Figure 12:
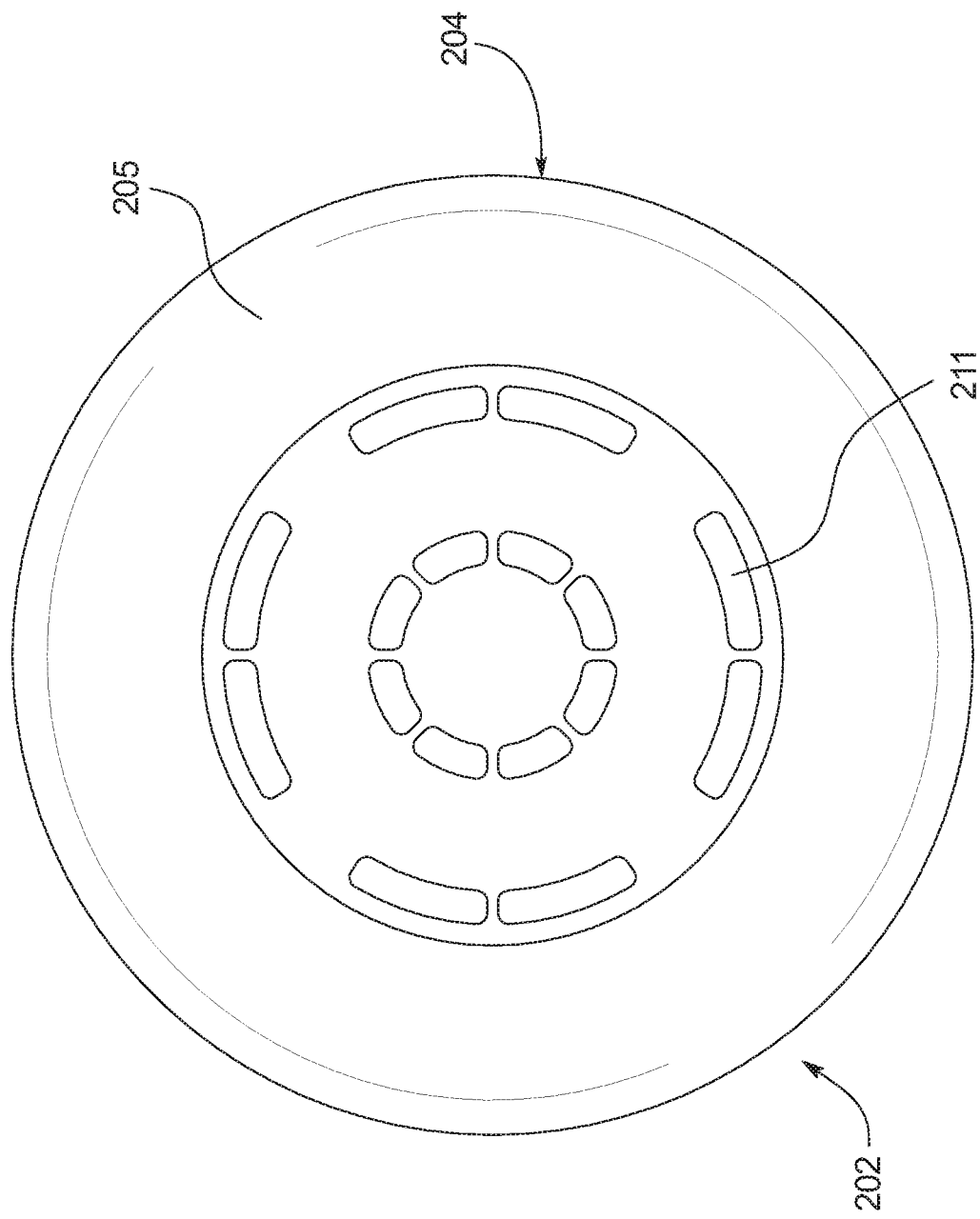
FIG. 12 is a bottom plan view of the stem of FIG. 10.
Figure 21A:
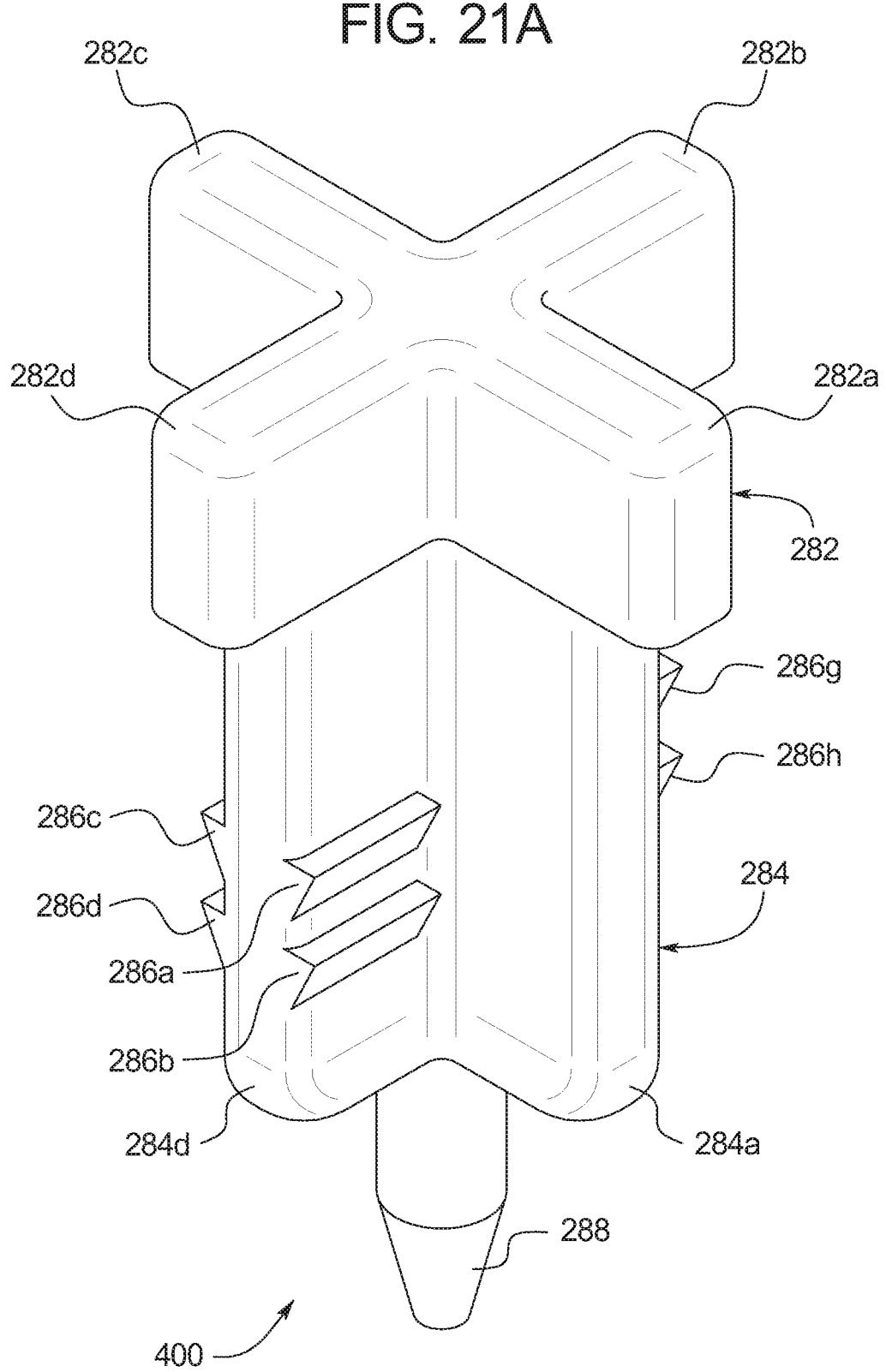
FIG. 21A is a perspective view of the locking member of the valve of FIG. 1 shown from a first side.
Figure 21B:
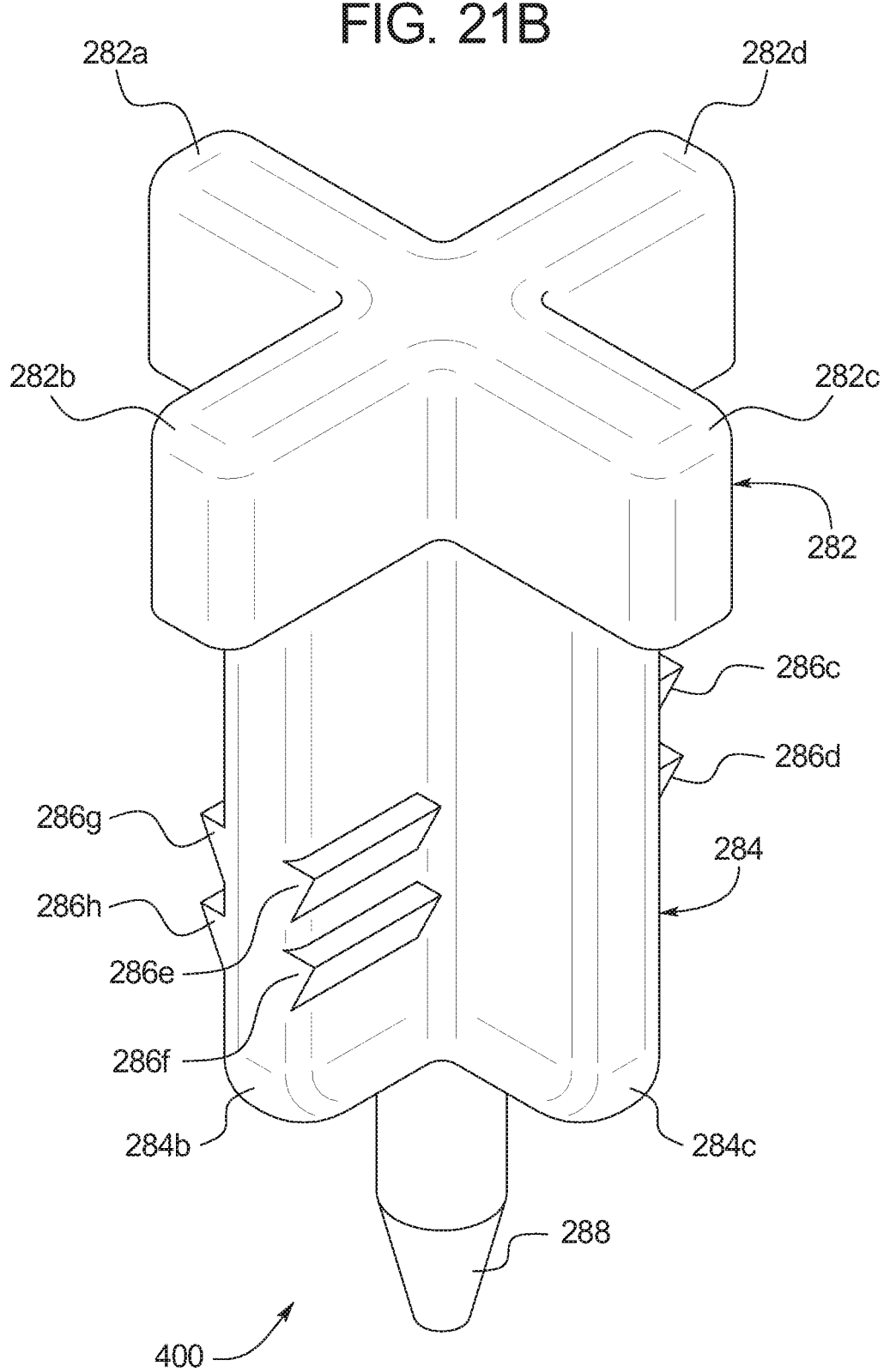
FIG. 21B is another perspective view of the locking member of FIG. 20A shown from a second side opposite the first side.
Figure 22:
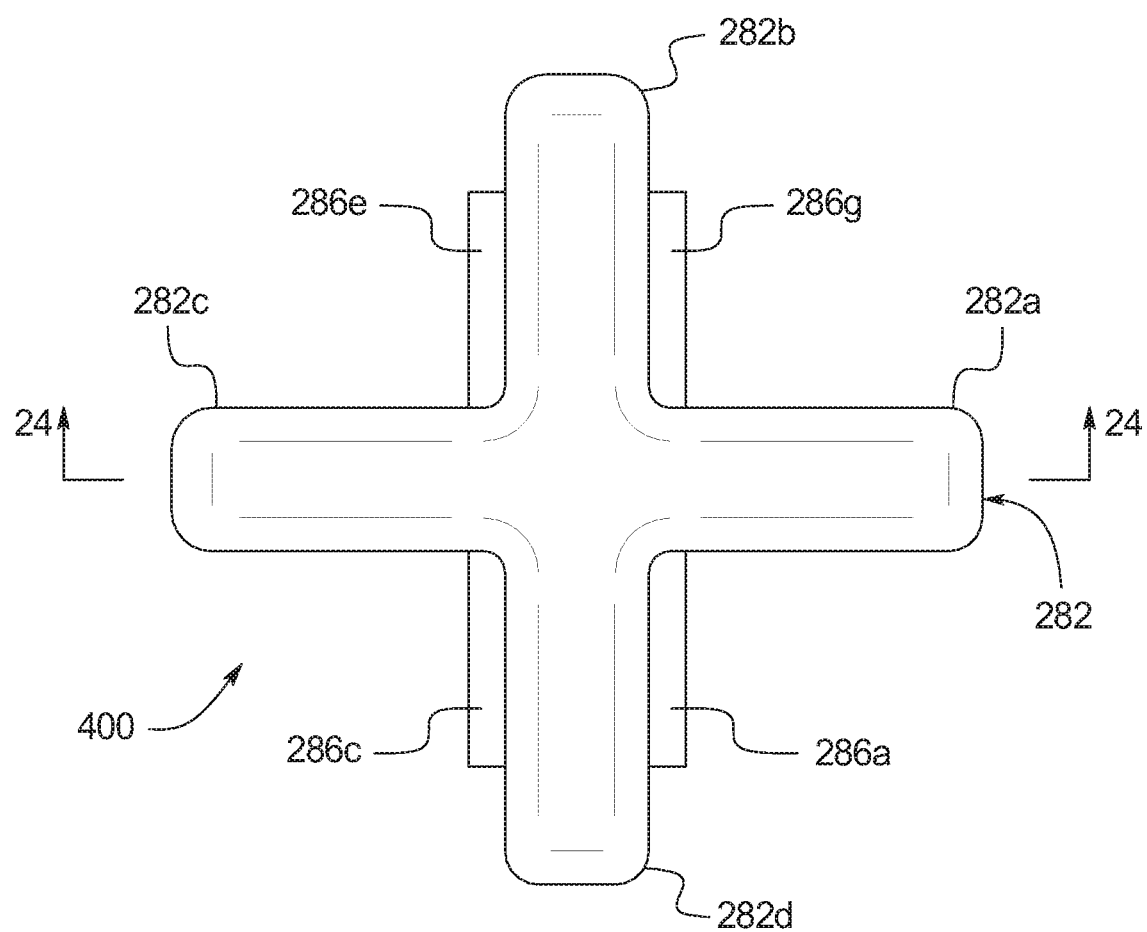
FIG. 22 is a top plan view of the locking member of FIG. 21A.
Figure 23B:
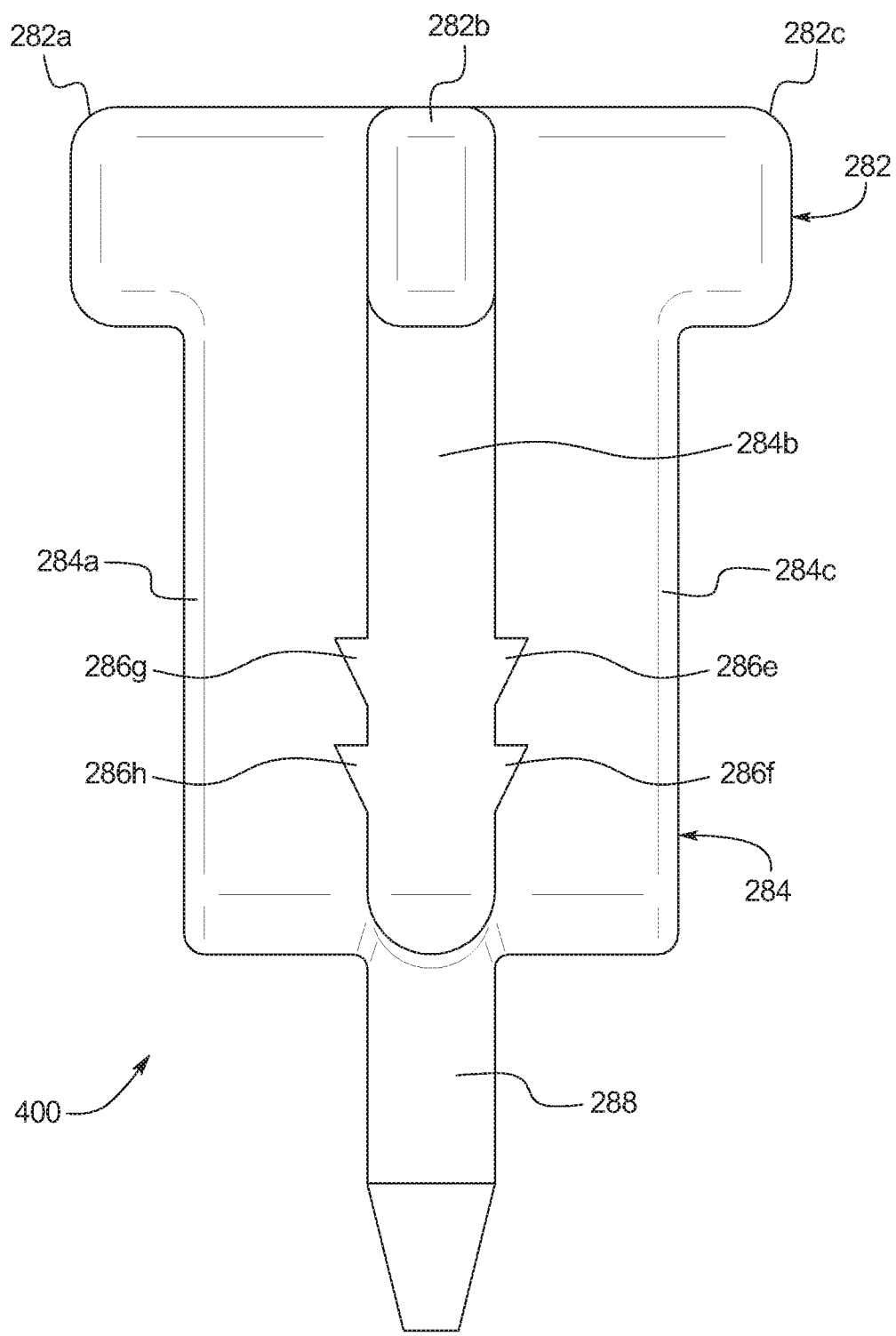
FIG. 23B is another side elevational view of the locking member of FIG. 21A shown from a second side opposite the first side.
Figure 24:
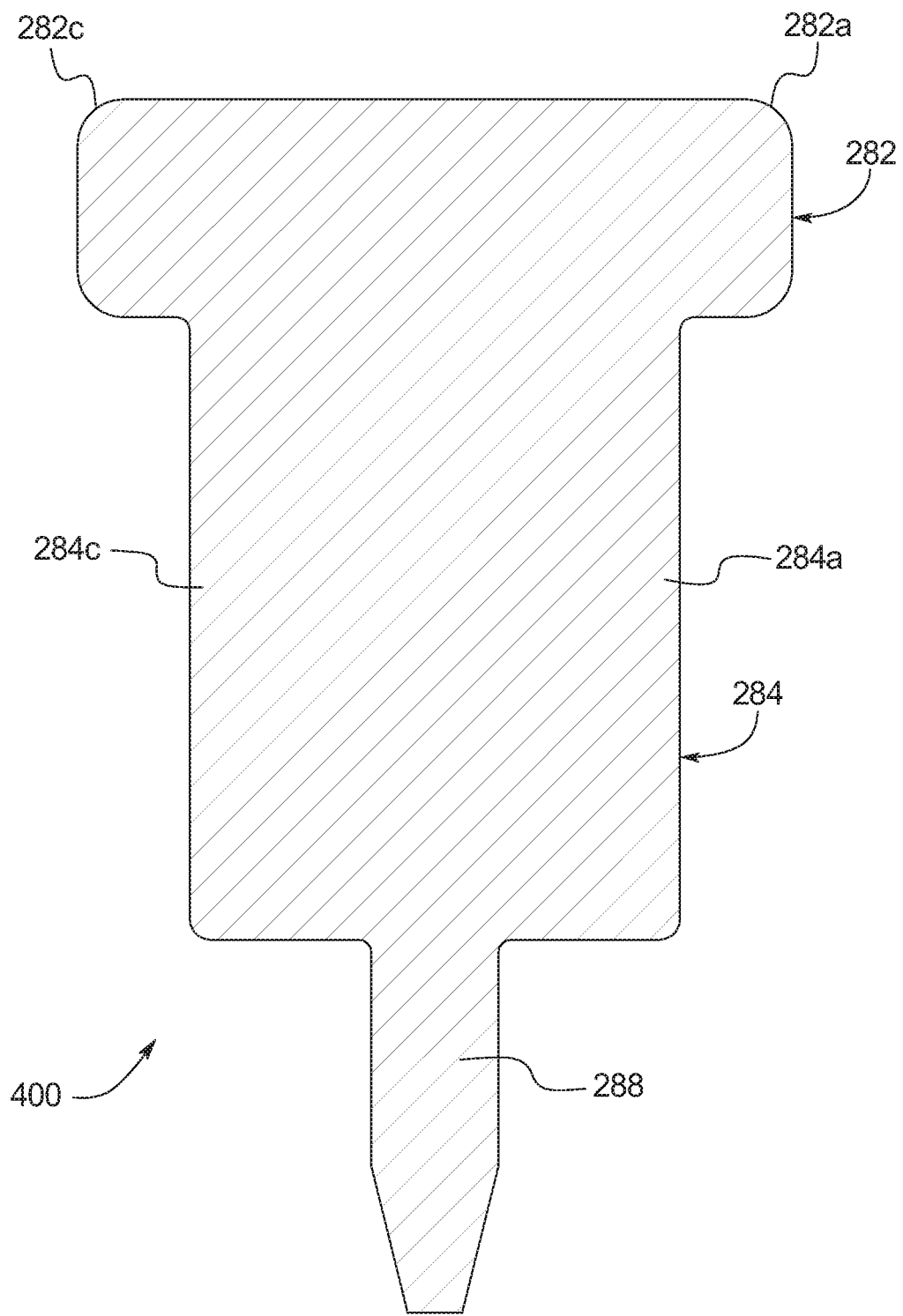
FIG. 24 is a cross-sectional view of the locking member of FIG. 21A taken substantially along line 24-24 of FIG. 23.

As best shown in FIG. 9, the standoffs 182, 184, and 186 are equally spaced-apart and extend axially downward (relative to $A_{VALVE}$) from lower surface 134 of the attachment flange 130. The standoff 182 includes an oblong hollow body 182a that defines an attachment-finger-receiving cavity 182b therein. The outwardly facing (relative to $A_{VALVE}$) portion of the body 182a defines a locking-tab-receiving opening 182c therethrough. The standoffs 184 and 186 are identical to the standoff 182 and are not separately described for brevity (though their numbering in the drawings corresponds to the element numbering for the standoff 182). The attachment-finger-receiving cavities are sized, shaped, positioned, and otherwise configured to receive locking fingers of the anti-puncture ring 500, as described below. The locking-tab-receiving openings are sized, shaped, positioned, and otherwise configured to receive locking tabs on the attachment fingers of the anti-puncture ring 500, as also described below. The standoffs function to prevent the inner bladder from being sucked onto the underside of the housing and blocking the gas passageway during deflation of the dunnage bag.

In this embodiment the housing 110 is a one-piece molded plastic component, though the housing may be formed from via any suitable manufacturing process, from any suitable material, and from any suitable quantity of pieces joined together.

The sealing assembly 200 is movably mounted to the housing 110 and configured to control (via its position relative to the housing 110) whether the valve 100 is in the open configuration or the closed configuration (and thus control the flow of gas through the housing 110 via the gas passageway 190). As best shown in FIGS. 4 and 9-19, the sealing assembly 200 includes a stem 202, a compressible sealing ring 240, and a sealing plate 250.

The stem 202 is best shown in FIGS. 10-14 and supports the sealing ring 240 and the sealing plate 250. The stem 202 includes a base 204 and a shaft 220. The base 204 includes a disc-shaped support 205, an annular outer ring 207 extending axially (relative to $A_{VALVE}$) upward from a perimeter of the support 205, and an annular inner ring 208 extending axially (relative to $A_{VALVE}$) upward from the support 205 near the center of the support 205. An annular sealing-ring-receiving channel 209 is defined between the outer ring 207 and the inner ring 208. The sealing-ring-receiving channel 209 is sized, shaped, positioned, and otherwise configured to receive the sealing ring 240, as described below.

The inner ring 208 defines multiple spaced-apart locking-leg-receiving openings 210a, 210b, 210c, and 210d that are sized, shaped, positioned, and otherwise configured to respectively receive attachment legs of the sealing plate 250 to enable the sealing plate 250 to be attached to the base 204 to hold the sealing ring 240 in place, as described below. The underside of the support 205 defines multiple recesses 211 (FIG. 11) that reduce the amount of material needed to form the support 205.

The shaft 220 is integrally connected to and extends axially (relative to $A_{VALVE}$) upwardly from the inner ring 208 of the base 204 and includes a cylindrical lower portion 221 integrally formed with an upper locking-member receiver 222. The lower portion 221 is integrally connected at a bottom end to the inner ring 208 of the base 204 and at a top end to the locking-member receiver 222. The lower portion 221 at least partially defines a locking-member-nose-receiving opening 221a (FIGS. 10 and 13) sized, shaped, positioned, and otherwise configured to receive a nose of the locking member 400, as described below.

The locking-member receiver 222 is configured to receive and lockingly engage the locking member 400 to maintain the spring 300 and the sealing assembly 200 in place on the housing 110. The locking-member receiver 222 extends axially (relative to $A_{VALVE}$) upwardly from the lower portion 221 and includes four spaced-apart locking arms 224, 228, 232, and 236. The locking-member-nose-receiving opening 221a of the lower portion 221 and the space between the locking arms 224, 228, 232, and 236 of the locking-member receiver 222 and together define a locking-member-receiving opening (not labeled). The locking-member-receiving opening is sized, shaped, positioned, and otherwise configured to receive the locking member 400 and enable the locking arms 224, 228, 232, and 236 lockingly engage the locking member 400, as described below.

The locking arm 224 includes a first arm portion 224a integrally connected to the lower portion 221 of the shaft 220, a second arm portion 224b integrally connected to the first arm portion 224a, and a third arm portion 224c integrally connected to the second arm portion 224b. The first arm portion 224a defines multiple locking notches 224e and 224f sized, shaped, positioned, and otherwise configured to receive locking ribs of the locking member 400, as described below. Part of the third arm portion 224c extends radially outwardly (relative to $A_{VALVE}$) from the second arm portion 224b such that its underside (not labeled) can act as a spring-engagement surface. The locking arms 228, 232, and 236 include similar components that are labeled in like manner in the Figures for reference but not separately described in the Detailed Description for brevity.

The locking arms 224, 228, 232, and 236 are configured to bend radially outwardly (relative to $A_{VALVE}$) in response to an applied force in that direction. The locking arms 224, 228, 232, and 236 are resilient enough to return to their original orientation when that force is removed. This property of the locking arms 224, 228, 232, and 236 ensures that the locking arms 224, 228, 232, and 236 lockingly engage the locking member 400 when inserted into the locking-member receiving opening, as described below.

In this embodiment the stem 202 is a one-piece molded plastic component, though the stem may be formed from via any suitable manufacturing process, from any suitable material, and from any suitable quantity of pieces joined together.

The sealing ring 240 is best shown in FIGS. 15-17 and is configured to sealingly engage the sealing seat 150 of the housing 110 when the valve 100 is in the closed configuration. The sealing ring 240 is annular and includes an outer ring 242, a middle ring 243 radially inward (relative to $A_{VALVE}$) of and shorter than the outer ring 242, and an inner ring 244 radially inward (relative to $A_{VALVE}$) of and taller than the middle ring 243. An annular sealing-plate-receiving channel 246 is defined between the outer ring 242 and the inner ring 244. The sealing-plate-receiving channel 246 is sized, shaped, positioned, and otherwise configured to receive part the sealing plate 250. The sealing ring 240 (and particularly the inner ring 244) also defines a cylindrical central opening 248 such that the sealing ring 240 circumscribes the shaft 220 when the sealing assembly 200 is assembled. The sealing ring 240 is sized, shaped, and otherwise configured to be positioned in the sealing-ring channel 209 of defined by the base 204 of the stem 202.

In one embodiment, the sealing ring 240 is made from an elastomeric material such as a vulcanized elastomeric or a thermoplastic vulcanizate. In other embodiments, the sealing ring is made from SANTOPRENE® (SANTOPRENE is a registered trademark of Monsanto Company Corporation). These are merely examples, and the sealing ring may be made of any suitable material that is compressible enough or otherwise configured to ensure a sealing engagement with the sealing seat 150 when the valve is in the closed configuration.

The sealing plate 250 is best shown in FIGS. 18-20 and is configured to retain the sealing ring 240 on the stem 202. The sealing plate 250 is generally annular and includes an annular outer ring 251 and an annular inner ring 253. The outer ring 251 is sized, shaped, positioned, and otherwise configured to be partially received in the sealing-plate-receiving channel 226 of the sealing ring 240 when the sealing assembly 200 is assembled, as best shown in FIGS. 3A and 3B. The inner ring 253 is integrally connected to and extends radially inwardly (relative to $A_{VALVE}$) from the outer ring 251. The inner ring 253 defines a central stem-receiving opening 254 sized, shaped, positioned, and otherwise configured such that the sealing plate 250 circumscribes the shaft 220 of the stem 202 when the sealing assembly 200 is assembled. Spaced-apart locking legs 258a, 258b, 258c, and 258d extend axially (relative to $A_{VALVE}$) downwardly from the underside (not labeled) of the inner ring 253. The locking legs 258 are sized, shaped, positioned, and otherwise configured to be received by the locking-leg-receiving openings 210 of the base 204, as shown in FIGS. 3A and 3B. This enables the sealing plate 250 to be attached to the base 204 and thus maintain the sealing ring 240 in place on to the stem 202. The locking legs 258 are sized so they frictionally engage the walls (not labeled) that define the locking-leg-receiving openings 210 and are retained within the locking-leg-receiving openings 210 via friction fit.

In this embodiment the sealing plate 250 is a one-piece molded plastic component, though the sealing plate may be formed from via any suitable manufacturing process, from any suitable material, and from any suitable quantity of pieces joined together.

To assemble the sealing assembly 200, the sealing ring 240 is positioned in the sealing-ring-receiving channel 209 of the stem 202 so the sealing-plate-receiving channel 246 of the sealing ring 240 faces upward. The sealing plate 250 is then installed so: (1) the locking legs 258a, 258b, 258c, and 258d are respectively received in the locking-leg-receiving openings 210a, 210b, 210c, and 210d of the base 204 and frictionally engage the walls that define those locking leg receivers; and (2) a lower portion (not labeled) of the outer ring 251 is received in the sealing-plate-receiving channel 246 of the sealing ring 240. After assembly, the sealing plate 250 retains the sealing ring 240 in the sealing-ring-receiving channel 209.

Figure 4:
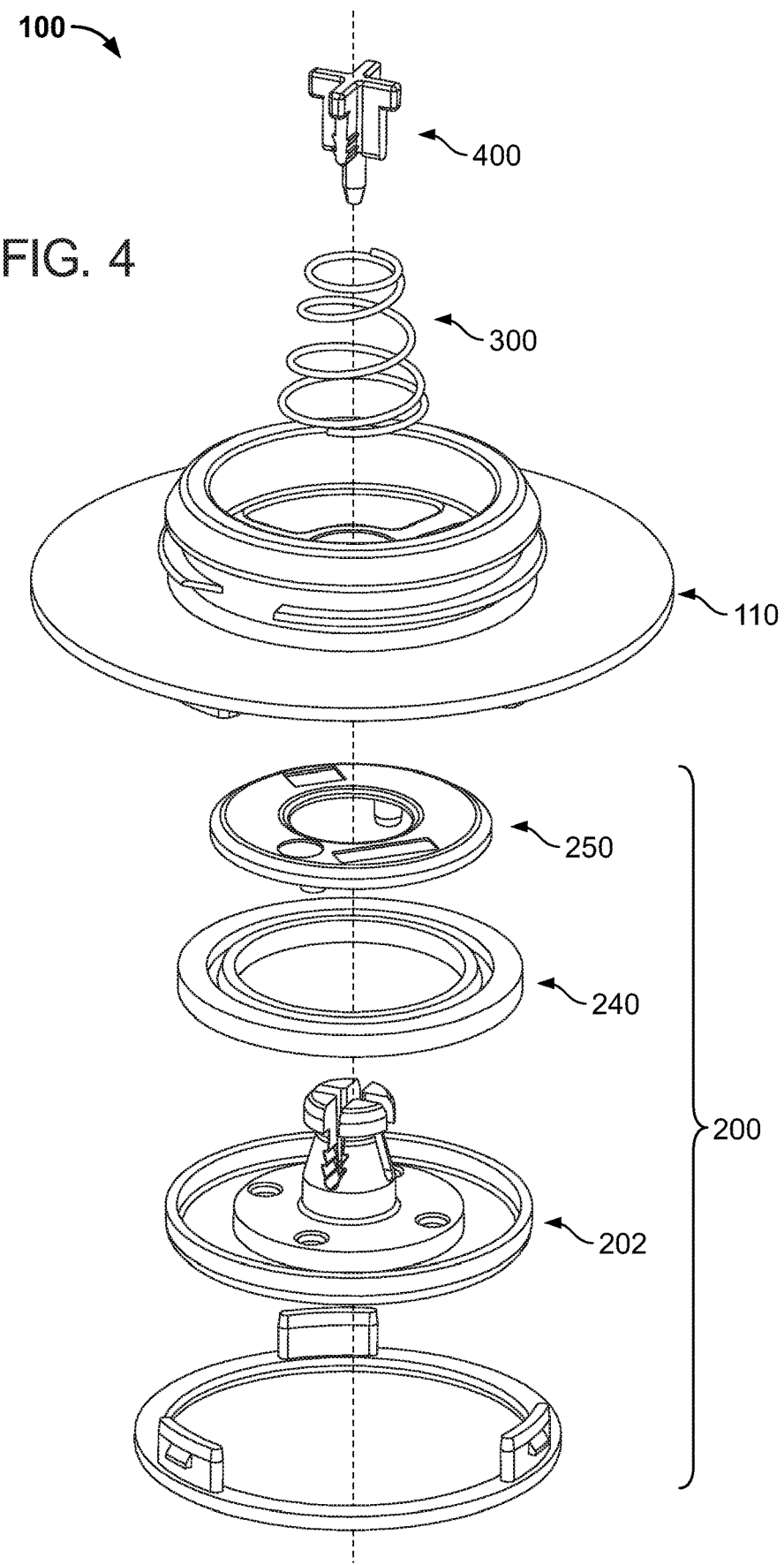
FIG. 4 is an exploded perspective view of the valve of FIG. 1.
Figure 5:
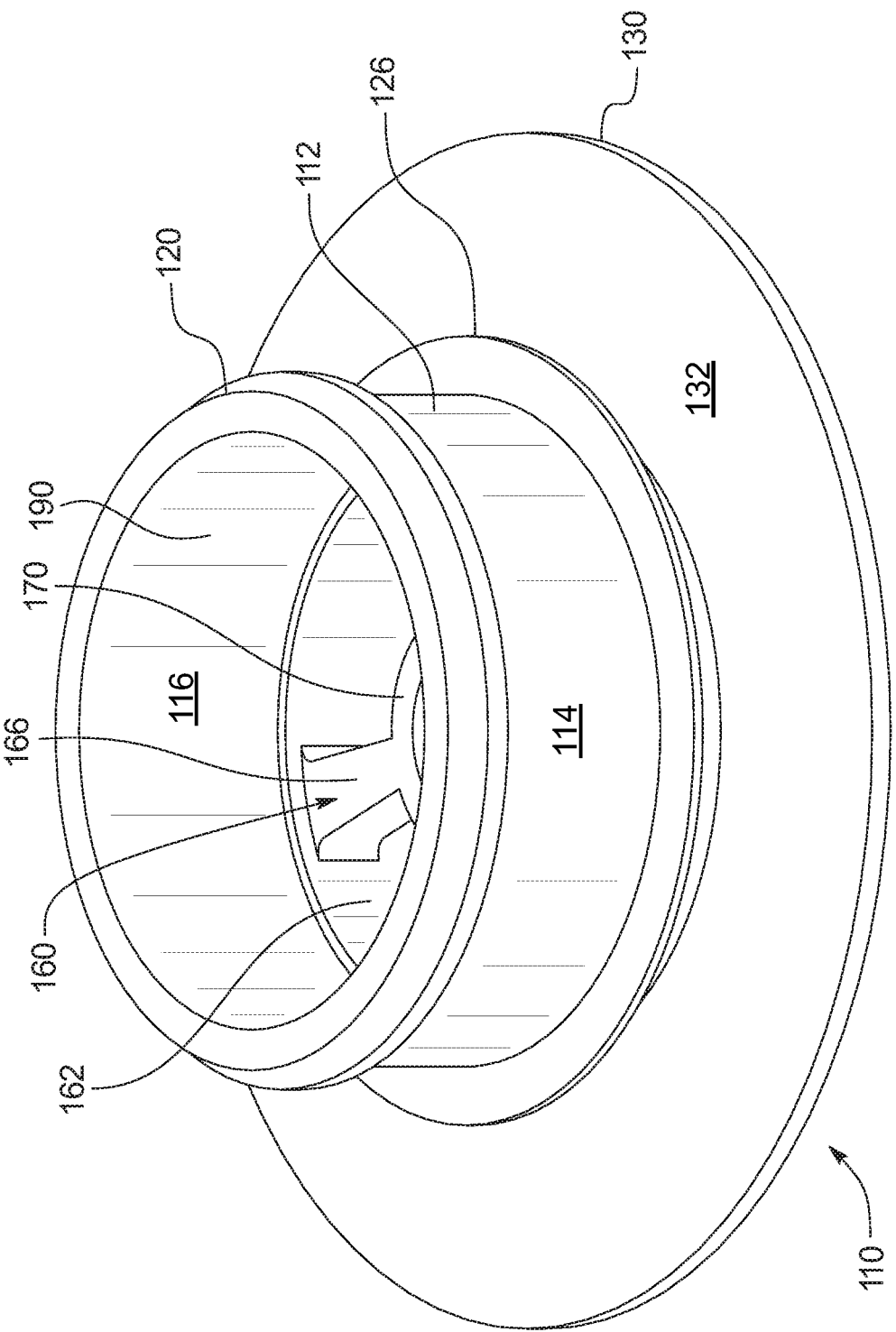
FIG. 5 is a top perspective view of the housing of the valve of FIG. 1.

The spring 300 is best shown in FIGS. 1 and 3-4 and is configured to bias the sealing assembly 200 to the closed position when the sealing assembly 200 is mounted to the housing 110. In this embodiment, the spring 300 is a conical steel compression spring, though the spring may have any suitable shape and be made from any suitable material.

The locking member 400 is best shown in FIGS. 21-24 and is sized, shaped, and otherwise configured to be inserted into the locking-member-receiving opening defined by the locking-member receiver 222 of the stem 202 and to lockingly engage the locking arms 224, 228, 232, and 236. Insertion of the locking member 400 into the locking-member-receiving opening causes the locking arms of the locking-member receiver 222 to bend radially outwardly to retain the spring 300 and the sealing assembly 200 in place on the housing 110. In this embodiment, the locking member 400 is configured such that is not readily removable from the stem 202 after installation. In certain embodiments, adhesive is employed to further secure the locking member 400 to the stem 202.

The locking member 400 includes a cross-shaped head 282 including four integrally connected head sections 282a, 282b, 282c, and 282d; a cross-shaped neck 284 including four integrally connected neck sections 284a, 284b, 284c, and 284d; multiple locking ribs 286a, 286b, 286c, 286d, 286e, 286f, 286g, and 286h; and a nose 288.

The head section 282a is integrally connected to the neck section 284a, the head section 282b is integrally connected to the neck section 284b, the head section 282c is integrally connected to the neck section 284c, and the head section 282d is integrally connected to the neck section 284d. The locking ribs 286a and 286b are integrally connected to and extend transversely from one side of the neck section 284d, and the locking ribs 286c and 286d are integrally connected to and extend transversely from the opposite side of the neck section 284d. The locking ribs 286e and 286f are integrally connected to and extend transversely from one side of the neck section 284b, and the locking ribs 286g and 286h are integrally connected to and extend transversely from the opposite side of the neck section 284b. The nose 288 is integrally connected to and extends axially (relative to $A_{VALVE}$) downwardly from the neck 284. The top surfaces of the locking ribs are generally horizontal and taper axially downwardly (relative to $A_{VALVE}$).

In this embodiment, the locking member 400 is a one-piece molded plastic component, though the sealing plate may be formed from via any suitable manufacturing process, from any suitable material, and from any suitable quantity of pieces joined together.

Figure 25:
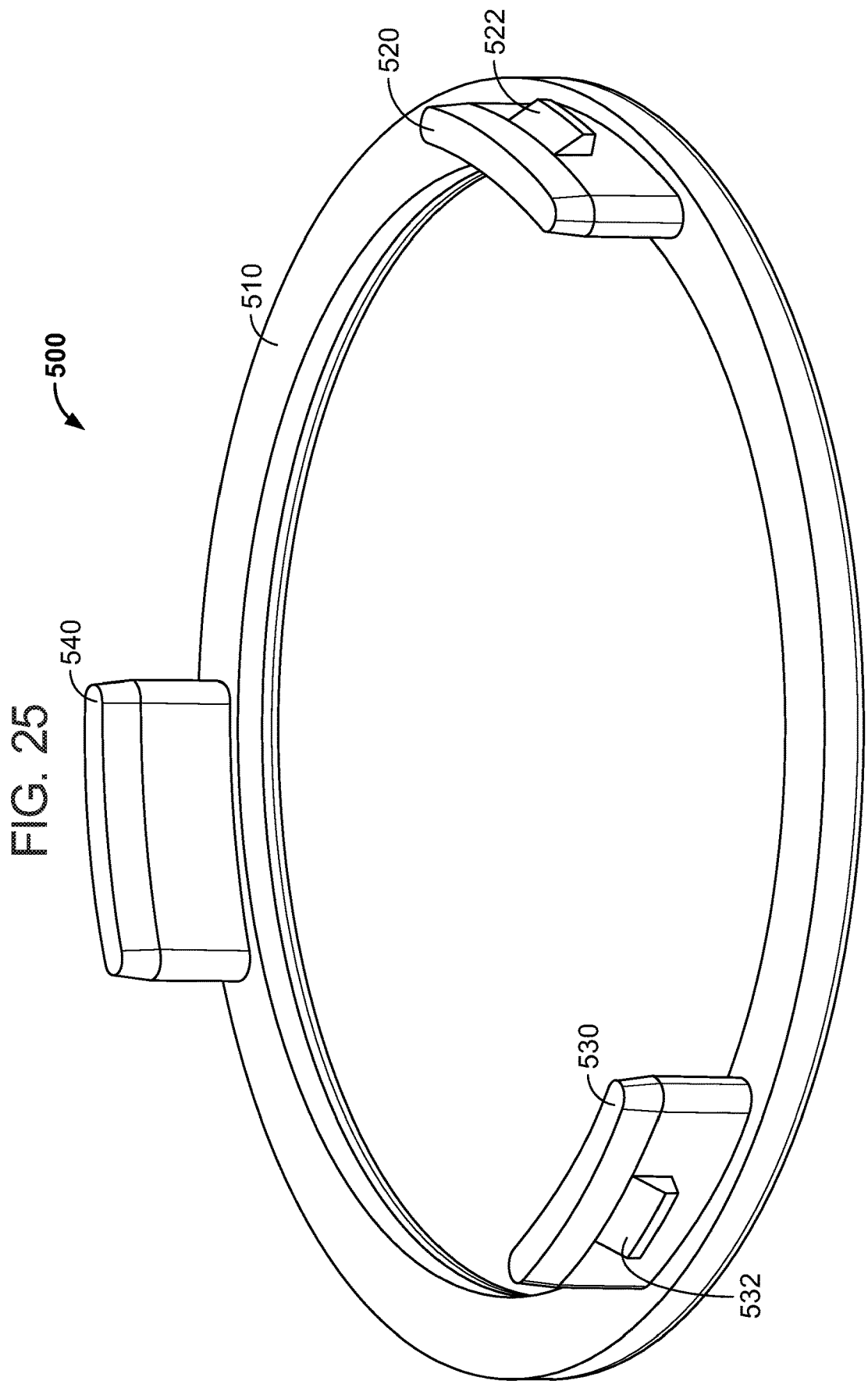
FIGS. 25 is a top perspective view of the anti-puncture ring of the valve of FIG. 1.

The anti-puncture ring 500 is best shown in FIG. 25 and is configured to prevent standoffs 182, 184, and 186 of the housing 110 from damaging the dunnage bag (such as by puncturing the dunnage bag). The anti-puncture ring 500 includes a base 510 and attachment fingers 520, 530, and 540 extending axially upwardly (relative to $A_{VALVE}$) from the base 510. The attachment fingers 520, 530, and 540 include respective locking tabs 522, 532, and 542 extending radially outwardly (relative to $A_{VALVE}$) from an outer face of the respective attachment finger. The attachment fingers 520, 530, and 540 are sized, shaped, positioned, and otherwise configured to be received in the attachment-finger-receiving cavities of the standoffs 182, 184, and 186 of the housing 110 Similarly, the locking tabs 522, 532, and 534 are sized, shaped, positioned, and otherwise configured to be received in the locking-tab-receiving openings of the standoffs 182, 184, and 186. This enables the anti-puncture ring to be attached to the housing 110, as described below.

In this embodiment the anti-puncture ring 500 is a one-piece molded plastic component, though the housing may be formed from via any suitable manufacturing process, from any suitable material, and from any suitable quantity of pieces joined together.

To assemble the valve 100, the shaft 220 of the stem 202 of the sealing assembly 200 is inserted through the stem-receiving opening 176 defined by the housing 110 and the sealing assembly 200 is moved (relative to the housing 110) into the closed position. With the sealing assembly 200 held in the closed position, the spring 300 is installed so it circumscribes the shaft 220 and so a bottom end (not labeled) of the spring 300 is seated on the stem supporter 160 and a top end (not labeled) of the spring 300 is just below or seated on the spring-engagement surfaces on the undersides of the third arm portions 224c, 228c, 232c, and 236c of the arms locking 224, 228, 232, and 236 of the locking-member receiver 222 of the shaft 220. The locking member 400 is then inserted into the locking-member-receiving opening of the locking-member receiver 222 to secure the spring 300 and the sealing assembly 200 on the housing.

Specifically, the locking member 400 is oriented so the nose 288 is aligned with the locking-member-nose-receiving opening 221a, the head portion 282a and the neck portion 284a are positioned above the space between the locking arms 224 and 228, the head portion 282b and the neck portion 284b are positioned above the space between the locking arms 228 and 232, the head portion 282c and the neck portion 284c are positioned above the space between the locking arms 232 and 236, and the head portion 282d and the neck portion 284d are positioned above the space between the locking arms 236 and 224. Alternatively, the locking member 400 could be rotated 180 degrees about $A_{VALVE}$ before insertion into the locking-member-receiving opening.

The locking member 400 is then moved axially downwardly (relative to $A_{VALVE}$) into the locking-member-receiving opening. The introduction of the head and neck portions between the respective arms forces the locking arms 224, 228, 232, and 236 of the locking-member receiver 222 to bend radially outwardly (relative to $A_{VALVE}$) to accommodate the size of the head and neck portions and their locking ribs. Continued movement of the locking member 400 eventually causes the nose 288 to be received in the locking-member-nose-receiving opening 221a, the locking ribs 286e and 286f to be respectively received in the locking-rib-receiving openings 232e and 232f, the locking ribs 286g and 286h to be respectively received in the locking-rib-receiving openings 228e and 228f, the locking ribs 286c and 286d to be respectively received in the locking-rib-receiving openings 236e and 236f, and the locking ribs 286a and 286b to be respectively received in the locking-rib-receiving openings 224e and 224f. As this occurs, the locking arms 224, 228, 232, and 236 move back to their original positions.

Once the locking member 400 is installed, the diameter formed by the third arm portions 224c, 228c, 232c, and 236c of the locking arms is larger than the diameter of the stem-receiving opening 176. This means that once the locking member 400 is installed on the sealing assembly 200, the sealing assembly 200 cannot be removed from the housing 110 without destroying the housing 110 or the sealing assembly 200. The respective engagements between the locking ribs and the locking-rib-receiving openings co-act to provide a secure engagement between the locking member 400 and the sealing assembly 200 that prevents the locking member 400 from being removed from the sealing assembly 200.

To complete assembly of the valve 100, the anti-puncture ring 500 is installed on the housing 110. Specifically, the attachment forgers 520, 530, and 540 of the anti-puncture ring 500 are inserted into the attachment-finger-receiving cavities 182b, 184b, and 186b of the standoffs 182, 184, and 186. Insertion of the attachment fingers into these cavities eventually causes the locking tabs 522, 532, and 542 to be received in and extend through the locking-tab-receiving openings 182c, 184c, and 186c of the standoffs 182, 184, and 186. This completes installation of the anti-puncture ring 500 and assembly of the valve 100.

In this embodiment, after the valve is assembled, the sealing assembly 200 is freely rotatable relative to the housing 110 about $A_{VALVE}$, and axial movement of the sealing assembly 200 causes the valve to switch between the closed and open configurations. The sealing assembly 200 may be in any rotational position relative to the housing 110 when in the valve 100 is in the open or closed configurations.

To attach the valve 100 to the dunnage bag, the upper surface 132 of the attachment flange 130 of the housing 110 is attached to an inner surface of the inner bladder of the dunnage bag in an airtight manner, such as via heat sealing. The inner bladder and the outer bag are positioned between the attachment flange 130 and the retaining ring 126 of the housing 110. Accordingly, when the valve 100 is attached to the dunnage bag, the attachment flange 130 and the portions of the housing 110 below it are inside the inner bladder, and the portions of the housing 110 above the retaining ring 126 are generally external to the dunnage bag.

In other embodiments, all of the locking arms have locking-rib-receiving openings such that the locking member can be inserted into the locking-member-receiving opening in any of four different orientations. In some of these embodiments, all of the neck portions include locking ribs. The locking arms may have any suitable quantity of locking-rib-receiving openings, and the locking member may have a corresponding quantity of locking ribs.

The invention claimed is:

1. A valve for an inflatable object, the valve comprising:
    a housing defining a gas passageway therethrough;
    a sealing assembly mounted to and moveable relative to the housing between a closed position that prevents gas from passing through the housing via the gas passageway and an open position that enables gas to pass through the housing via the gas passageway, the sealing assembly comprising a stem and a sealing ring mounted to the stem wherein the stem comprises a shaft that defines multiple locking-rib-receiving openings;
    a spring that biases the sealing assembly to the closed position; and
    a locking member lockingly engaged to the stem to retain the spring and the sealing assembly on the housing, wherein the locking member comprises multiple locking ribs, wherein the locking-rib-receiving openings of the shaft are sized and shaped to receive the locking ribs,
    wherein the sealing ring of the sealing assembly sealingly engages the housing when the sealing assembly is in the closed position and is spaced-apart from the housing when the sealing assembly is in the open position.

2. The valve of claim 1, wherein the shaft comprises multiple spaced-apart locking arms each configured to receive and lockingly engage the locking member.

3. The valve of claim 2, wherein the locking arms define the locking-rib-receiving openings.

4. The valve of claim 1, wherein the locking member comprises a cross-shaped head comprising multiple connected head sections and a cross-shaped neck comprising multiple connected neck sections.

5. The valve of claim 4, wherein the locking ribs extend from at least two of the neck sections.

6. The valve of claim 4, wherein one of the locking ribs extends from one side of one of the neck sections and another one of the locking ribs extends from an opposite side of that neck section.

7. The valve of claim 4, wherein two of the locking ribs extend from one side of one of the neck sections and another two of the locking ribs extend from an opposite side of that neck section.

8. The valve of claim 1, wherein the housing comprises an annular wall, a sealing seat at the bottom of the wall, and a stem supporter radially inward of an inner surface of the wall.

9. The valve of claim 8, wherein the stem supporter defines a stem-receiving opening, wherein the shaft of the stem of the stem assembly extends through the stem-receiving opening.

10. The valve of claim 9, wherein the spring is positioned between the stem supporter and a spring-engagement surface of the shaft of the stem of the sealing assembly.

11. The valve of claim 8, wherein the housing further comprises multiple standoffs extending from an underside of the housing, each standoff including a hollow body defining an attachment-finger-receiving cavity and a locking-tab-receiving opening.

12. The valve of claim 11, further comprising an anti-puncture ring comprising a base and multiple attachment fingers extending from the base, each attachment finger comprising a transversely extending locking tab.

13. The valve of claim 12, wherein the anti-puncture ring is attached to the housing such that the attachment fingers of the anti-puncture ring are received in respective attachment-finger-receiving cavities of the standoffs of the housing and such that the locking tabs of the anti-puncture ring are received in respective locking-tab-receiving openings of the standoffs.

14. The valve of claim 1, wherein the sealing assembly further comprises a sealing plate attached to the stem and retaining the sealing ring in place on the stem.

15. An inflatable object comprising:
an inflatable/deflatable body; and
a valve attached to the body and in fluid communication with an interior of the body, the valve comprising:
a housing defining a gas passageway therethrough;
a sealing assembly mounted to and moveable relative to the housing between a closed position that prevents gas from passing through the housing via the gas passageway and an open position that enables gas to pass through the housing via the gas passageway, the sealing assembly comprising a stem and a sealing ring mounted to the stem wherein the stem comprises a shaft that defines multiple locking-rib-receiving openings;
a spring that biases the sealing assembly to the closed position; and
a locking member lockingly engaged to the stem to retain the spring and the sealing assembly on the housing, wherein the locking member comprises multiple locking ribs, wherein the locking-rib-receiving openings of the shaft are sized and shaped to receive the locking ribs,
wherein the sealing ring of the sealing assembly sealingly engages the housing when the sealing assembly is in the closed position and is spaced-apart from the housing when the sealing assembly is in the open position.

16. The inflatable object of claim 15, wherein the housing comprises an annular wall, a sealing seat at the bottom of the wall, and a stem supporter radially inward of an inner surface of the wall.

17. The inflatable object of claim 16, wherein the housing further comprises multiple standoffs extending from an underside of the housing, each standoff including a hollow body defining an attachment-finger-receiving cavity and a locking-tab-receiving opening.

18. The inflatable object of claim 17, further comprising an anti-puncture ring comprising a base and multiple attachment fingers extending from the base, each attachment finger comprising a transversely extending locking tab.

19. The inflatable object of claim 18, wherein the anti-puncture ring is attached to the housing such that the attachment fingers of the anti-puncture ring are received in respective attachment-finger-receiving cavities of the standoffs of the housing and such that the locking tabs of the attachment fingers are received in respective locking-tab-receiving openings of the standoffs.

20. The inflatable object of claim 15, wherein the sealing assembly of the valve further comprises a sealing plate attached to the stem and retaining the sealing ring in place on the stem.

21. A valve for an inflatable object, the valve comprising:
a housing defining a gas passageway therethrough and further comprises multiple standoffs extending from an underside of the housing, each standoff including a hollow body defining an attachment-finger-receiving cavity and a locking-tab-receiving opening;
a sealing assembly mounted to and moveable relative to the housing between a closed position that prevents gas from passing through the housing via the gas passageway and an open position that enables gas to pass through the housing via the gas passageway, the sealing assembly comprising a stem and a sealing ring mounted to the stem;
a spring that biases the sealing assembly to the closed position; and
a locking member lockingly engaged to the stem to retain the spring and the sealing assembly on the housing,
wherein the sealing ring of the sealing assembly sealingly engages the housing when the sealing assembly is in the closed position and is spaced-apart from the housing when the sealing assembly is in the open position.

22. The valve of claim 21, further comprising an anti-puncture ring comprising a base and multiple attachment fingers extending from the base, each attachment finger comprising a transversely extending locking tab.

23. The valve of claim 22, wherein the anti-puncture ring is attached to the housing such that the attachment fingers of the anti-puncture ring are received in respective attachment-finger-receiving cavities of the standoffs of the housing and such that the locking tabs of the anti-puncture ring are received in respective locking-tab-receiving openings of the standoffs.

24. The valve of claim 21, wherein the sealing assembly further comprises a sealing plate attached to the stem and retaining the sealing ring in place on the stem.

25. An inflatable object comprising:
an inflatable/deflatable body; and
a valve attached to the body and in fluid communication with an interior of the body, the valve comprising:
a housing defining a gas passageway therethrough and further defining multiple standoffs extending from an underside of the housing, each standoff including a hollow body defining an attachment-finger-receiving cavity and a locking-tab-receiving opening;
a sealing assembly mounted to and moveable relative to the housing between a closed position that prevents gas from passing through the housing via the gas passageway and an open position that enables gas to pass through the housing via the gas passageway, the sealing assembly comprising a stem and a sealing ring mounted to the stem;
a spring that biases the sealing assembly to the closed position; and
a locking member lockingly engaged to the stem to retain the spring and the sealing assembly on the housing,
wherein the sealing ring of the sealing assembly sealingly engages the housing when the sealing assembly is in the closed position and is spaced-apart from the housing when the sealing assembly is in the open position.

26. The inflatable object of claim 25, further comprising an anti-puncture ring comprising a base and multiple attachment fingers extending from the base, each attachment finger comprising a transversely extending locking tab.

27. The inflatable object of claim 26, wherein the anti-puncture ring is attached to the housing such that the attachment fingers of the anti-puncture ring are received in respective attachment-finger-receiving cavities of the standoffs of the housing and such that the locking tabs of the attachment fingers are received in respective locking-tab-receiving openings of the standoffs.

28. The inflatable object of claim 25, wherein the sealing assembly of the valve further comprises a sealing plate attached to the stem and retaining the sealing ring in place on the stem.

* * * * *